(12) United States Patent
Lauterbach et al.

(10) Patent No.: US 11,734,880 B2
(45) Date of Patent: Aug. 22, 2023

(54) SENSOR CALIBRATION WITH ENVIRONMENT MAP

(71) Applicant: Waymo LLC, Mountain View, CA (US)

(72) Inventors: Christian Lauterbach, Campbell, CA (US); Colin Andrew Braley, Mountain View, CA (US); Carlos Hernandez Esteban, Kirkland, WA (US); Michael Montemerlo, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 194 days.

(21) Appl. No.: 17/139,557

(22) Filed: Dec. 31, 2020

(65) Prior Publication Data

US 2022/0204019 A1 Jun. 30, 2022

(51) Int. Cl.
| | |
|---|---|
| *G06T 17/00* | (2006.01) |
| *G06T 15/20* | (2011.01) |
| *G01C 21/36* | (2006.01) |
| *G06V 20/20* | (2022.01) |
| *G06V 20/56* | (2022.01) |
| *G01S 17/89* | (2020.01) |
| *G06T 17/05* | (2011.01) |
| *G06T 17/20* | (2006.01) |
| *G01S 17/88* | (2006.01) |
| *G06V 20/58* | (2022.01) |

(Continued)

(52) U.S. Cl.
CPC .......... *G06T 17/00* (2013.01); *G01C 21/3667* (2013.01); *G01S 17/88* (2013.01); *G01S 17/89* (2013.01); *G06F 18/2113* (2023.01); *G06F 18/24* (2023.01); *G06T 15/205* (2013.01); *G06T 17/05* (2013.01); *G06T 17/20* (2013.01); *G06V 10/44* (2022.01); *G06V 20/20* (2022.01); *G06V 20/56* (2022.01); *G06V 20/58* (2022.01); *G06T 2207/10028* (2013.01); *G06T 2210/56* (2013.01)

(58) Field of Classification Search
None
See application file for complete search history.

(56) References Cited

U.S. PATENT DOCUMENTS

| | | | |
|---|---|---|---|
| 10,915,731 B2* | 2/2021 | Mccormac | G06K 9/6257 |
| 10,928,490 B2* | 2/2021 | Tatipamula | G01S 7/4861 |

(Continued)

OTHER PUBLICATIONS

Behley et al., "Efficient Surfel-Based SLAM using 3D Laser Range Data in Urban Environments," Robotics: Science and Systems, 2018, 10 pages.

(Continued)

*Primary Examiner* — Saptarshi Mazumder
(74) *Attorney, Agent, or Firm* — Fish & Richardson P.C.

(57) ABSTRACT

Methods, systems, and apparatus, including computer programs encoded on computer storage media, for sensor calibration with environment map. In some implementations, a three-dimensional surfel representation of a real-world environment is obtained. One or more surfels of the surfel representation having a particular classification of the different classifications are selected. Input sensor data from one or more sensors installed on an autonomous or semi-autonomous vehicle are received. The input sensor data is compared to the surfel representation to identify one or more differences between the observation and the surfel representation. At least one sensor of the one or more sensors is calibrated using the one or more differences between the observation and the surfel representation.

20 Claims, 10 Drawing Sheets

(51) Int. Cl.
  *G06V 10/44*    (2022.01)
  *G06F 18/24*    (2023.01)
  *G06F 18/2113*  (2023.01)

(56) References Cited

U.S. PATENT DOCUMENTS

2019/0137297 A1* 5/2019 Ueda .................. G06F 3/04817
2020/0080848 A1* 3/2020 Sprague ................ G06F 16/909
2021/0407187 A1* 12/2021 Gupta .................. G06F 16/587

OTHER PUBLICATIONS

Park et al., "Probabilistic Surfel Fusion for Dense LiDAR Mapping," Proceedings of the IEEE International Conference on Computer Vision, 2017, pp. 2418-2426.

Pfister et al., "Surfels: surface elements as rendering primitives." Proceedings of the 27th annual conference on Computer graphics and interactive techniques, 2000, pp. 335-342.

Schops et al., "SurfelMeshing: Online Surfel-Based Mesh Reconstruction," CoRR, Oct. 2018, arxiv.org/abs/1810.00729v1, 13 pages.

Stuckler et al., "Efficient Mobile Robot Navigation using 3D Surfel Grid Maps," In Proc. of the German Conference on Robotics, May 2012, 5 pages.

Stuckler et al., "Multi-Resolution Surfel Maps for Efficient Dense 3D Modeling and Tracking," Journal of Visual Communication and Image Representation, Jan. 2014, 25(1): 137-147.

Wang et al., "Real-time Scalable Dense Surfel Mapping," 2019 International Conference on Robotics and Automation, May 2019, pp. 6919-6925.

* cited by examiner

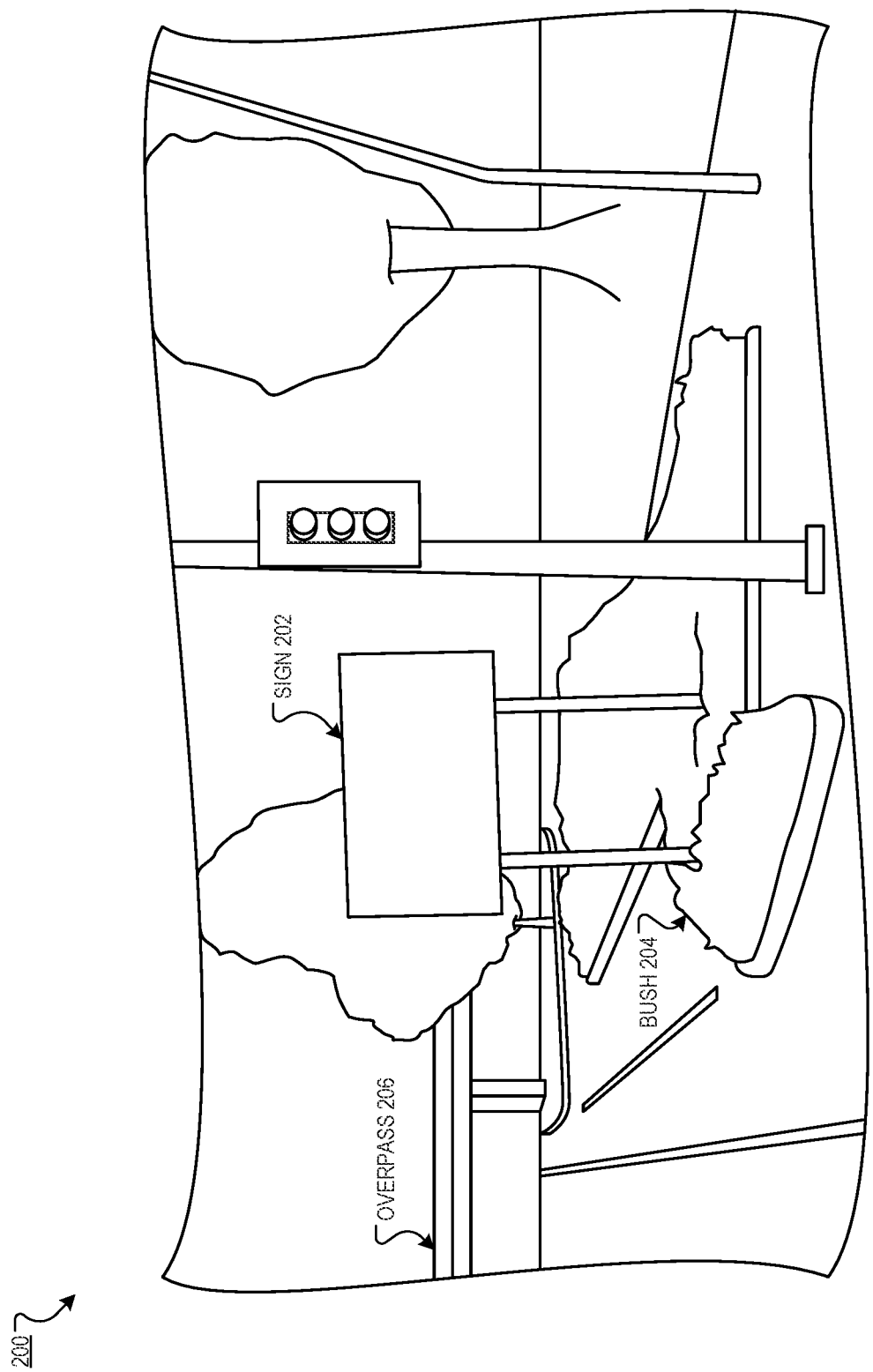

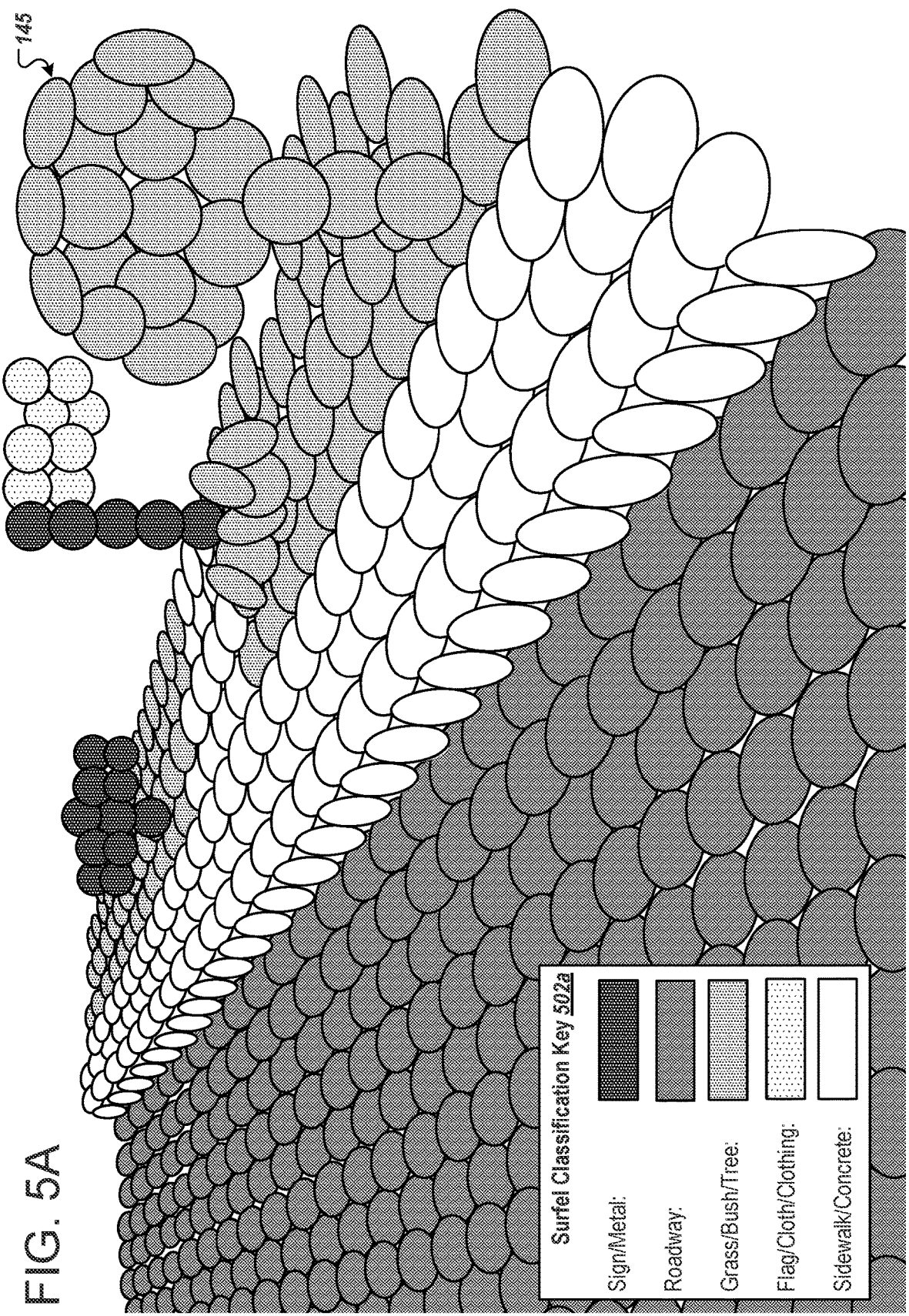

SENSOR CALIBRATION WITH ENVIRONMENT MAP

TECHNICAL FIELD

This specification relates to techniques for calibrating sensors, and for navigating autonomous or semi-autonomous vehicles.

BACKGROUND

Autonomous vehicles include self-driving cars, boats, and aircraft. Autonomous vehicles use a variety of on-board sensors in tandem with map representations of the environment in order to make control and navigation decisions.

Some vehicles use maps to navigate or otherwise operate in the environment, where the maps include representations of characteristics of the operating environment. However, these maps may include representations of characteristics in the environment that are unreliable, such as those representations of characteristics in the environment that change over time or that are likely to change over time. As such, the operation of these vehicles may, in part, rely on representations in the maps that are unreliable, which can lead to errors or inefficiencies during the navigation of these vehicles in the environment.

Accordingly, one challenging aspect of autonomous vehicle operation is identifying and accounting for the inherently unreliable characteristics of an environment that can change over time. Thus, a common problem is the navigation systems of vehicles becoming confused as to where it is specifically located with respect to environment, and/or making navigation errors when a current view of the environment does not match a corresponding map of the environment due to changes in the environment from a time that the map is generated and a present time. These unreliable representations can also lead to other problems, such as sensors of the navigation systems being miscalibrated.

SUMMARY

This specification describes how a vehicle, e.g. an autonomous or semi-autonomous vehicle, can use a surfel map that represents a real-world environment to modify a surfel map that represents a real-world environment to improve calibration of on-board sensors. Notably, a subset of surfels in the surfel map may be selected to be used for the calibration of one or more of the vehicle's on-board sensors. This subset of surfels may be identified based on a determined or predicted reliability of the surfels in representing the real-world environment. For example, the subset of surfels may include surfels that represent objects in the real-world environment are determined with sufficient likelihood not to change position and/or appearance. In using this subset of surfels for calibration, the operation of the vehicle in the environment can be improved, by, for example, improving the accuracy of the perceived location of the vehicle in the environment, improving the accuracy of perceived locations of objects in the environment, and improving the calibration accuracy of various sensors of a navigation system of the vehicle. As another advantage, by focusing calibration efforts on only the subset of surfels in the surfel map, the amount of sensor data required to be collected and, relatedly, the processing requirements on the vehicle's navigation system can be reduced.

In some implementations, the surfel map is modified to include only the subset of reliable surfels. For example, the surfel map may be modified to have all other surfels removed or hidden from the surfel map. Having been simplified with respect to the surfel map, the resulting modified surfel map can reduce the amount of sensor data required to be collected and the processing requirements on the vehicle's navigation system to analyze the modified surfel map and process the sensor data.

As an example, the navigation system of the vehicle may access a surfel map corresponding to a particular section of a road that the vehicle is currently traveling along. The navigation system may proceed to hide all surfels in the surfel map that are associated with a type of object that is deemed unreliable. For example, the navigation system may hide any surfels that have been tagged as representing a plant, a person, an animal, or a vehicle. The navigation system may use the resulting modified surfel map to determine what sensor data to collect, and/or a subset of collected sensor data that is required to be analyzed. For example, the navigation system may only collect sensor data in a direction that corresponds to one or more objects having representations in the modified surfel map. Similarly, the navigation system may only process sensor data corresponding to one or more objects having representations in the modified surfel map.

In some implementations, the vehicle, such as a navigation system of the vehicle, uses the modified surfel map to calibrate one or more sensors of the navigation system. For example, the navigation system may obtain sensor data corresponding to a reliable object located in the environment, the reliable object having a representation in the modified surfel map. The navigation system may analyze the sensor data to identify a corresponding area in the modified surfel map. The navigation system may proceed to compare the sensor data to the corresponding area, and, based on differences between the sensor data and the area of the modified surfel map, update the parameters of the one or more sensors.

As an example, the navigation system may use an onboard camera to collect image data and a lidar sensor to collect laser data. The navigation system may analyze the image data to identify features in the image data, and proceed to match those features to corresponding features in the modified surfel map. By comparing the features in the images to corresponding features in the modified surfel map, the navigation system can determine changes to the position and/or orientation of the camera (and/or the lidar sensor) needed to align the camera (and/or the lidar sensor) to the modified surfel map. The navigation system can use these changes to the position and/or orientation for alignment to modify the collected laser data to align the laser data with the modified surfel map. The navigation system can then perform point matching between the laser data and the modified surfel map to identify, for example, differences between observed point distances and expected point distances, and differences between observed beam angles and expected beam angles. The results can be used to update various parameters of the camera and the lidar sensor. For example, an offset range measurement can be updated. Moreover, roll, pitch, and yaw angles between the camera and the lidar sensor can be updated.

In one general aspect, a method includes: obtaining a three-dimensional surfel representation of a real-world environment, the surfel representation includes a plurality of surfels, where each of the surfels corresponds to a respective location of plurality of locations in a three-dimensional space of the real-world environment, and where multiple surfels of the plurality of surfels are associated with a plurality of different classifications; selecting one or more surfels of the surfel representation having a particular classification f the different classifications; receiving input sensor data from one or more sensors installed on an autonomous or semi-autonomous vehicle, the input sensor data indicating an observation of at least a portion of the real-world environment; comparing the input sensor data to the surfel representation to identify one or more differences between the observation and the surfel representation; and calibrating at least one sensor of the one or more sensors using the one or more differences between the observation and the surfel representation.

Implementations include one or more of the following features. For example, in some implementations, the method includes updating the surfel representation based on the one or more surfels, where comparing the input sensor data to the surfel representation to identify the one or more differences between the observation and the surfel representation includes comparing the input sensor data to the updated surfel representation to identify one or more differences between the observation and the updated surfel representation.

In some implementations, updating the surfel representation based on the one or more surfels includes filtering the surfel representation to remove or hide the one or more surfels having the particular classification.

In some implementations, selecting the one or more surfels of the surfel representation having the particular classification includes selecting all surfels in the surfel representation that have the particular classification; and updating the surfel representation based on the one or more surfels includes filtering the surfel representation to remove or hide all surfels in the representation that have the particular classification.

In some implementations, selecting the one or more surfels of the surfel representation having the particular classification includes selecting one or more surfels in the surfel representation that have been associated with a particular object of the real-world environment; and updating the surfel representation based on the one or more surfels includes filtering the surfel representation to remove or hide all surfels in the surfel representation that have been associated with a particular object of the real-world environment.

In some implementations, selecting the one or more surfels of the surfel representation having the particular classification includes selecting the one or more surfels in the surfel representation that have the particular classification based on a type of environment of the real-world environment; and updating the surfel representation based on the one or more surfels includes filtering the surfel representation to remove or hide the one or more surfels.

In some implementations, selecting the one or more surfels of the surfel representation having the particular classification includes selecting one or more surfels in the surfel representation that have been identified as untrustworthy; and updating the surfel representation based on the one or more surfels includes filtering the surfel representation to remove or hide the one or more surfels in the surfel representation that have been identified as untrustworthy.

In some implementations, updating the surfel representation based on the one or more surfels includes attaching a tag to surfels in the surfel representation other than the one or more surfels, where the tag indicates that the corresponding surfels are sufficiently reliable.

In some implementations, updating the surfel representation based on the one or more surfels includes attaching a tag to the one or more surfels, where the tag indicates that the corresponding surfels are not sufficiently reliable.

In some implementations, selecting the one or more surfels of the surfel representation having the particular classification includes selecting all surfels in the surfel representation that are associated with vegetation.

In some implementations, selecting the one more surfels of the surfel representation having the particular classification includes selecting all surfels in the surfel representation that are associated with types of objects other than one or more of the following types of objects: buildings; roadways; road signs; or road barriers.

In some implementations, receiving input sensor data from the sensors installed on the autonomous or semi-autonomous vehicle includes receiving laser data from a lidar system, and the one or more sensors installed on the autonomous or semi-autonomous vehicle include the lidar system.

In some implementations, comparing the input sensor data to the surfel representation to identify the one or more differences between the observation and the surfel representation includes: estimating three-dimensional point data from the laser data, where the observation is the three-dimensional point data; and performing dense image matching using the three-dimensional point data to identify point matches between the observation and the surfel representation, the one or more differences between the observation and the surfel representation include one or more distances between the matching points in the point data and corresponding surfels in the surfel representation, and calibrating the at least one sensor includes calibrating the lidar system using the one or more distances.

In some implementations, receiving input sensor data from the one or more sensors installed on the autonomous or semi-autonomous vehicle includes receiving image data from one or more cameras, and the one or more sensors installed on the autonomous or semi-autonomous vehicle include the one or more cameras.

In some implementations, comparing the input sensor data to the surfel representation to identify the one or more differences between the observation and the surfel representation includes performing feature matching using the image data and the surfel representation to identify one or more features in the image data that match corresponding one or more features in the surfel representation, the one or more features in the surfel representation correspond to one or more groupings of surfels in the surfel representation, the one or more differences between the observation and the three-dimensional representation include one or more distances between the one or more features in the image data and corresponding one or more groupings of surfels in the surfel representation, and calibrating the at least one sensor includes calibrating the one or more cameras using the one or more distances.

In some implementations, calibrating the one or more cameras includes adjusting one or more of the following: an offset of a camera of the one or more cameras; a rotation a camera of the one or more cameras; radial distortion parameters of a lens of a camera of the one or more cameras; or a focal length of a lens of a camera of the one or more cameras.

In some implementations, the method includes determining a type of environment of the real-world environment using the surfel representation, where calibrating the at least one sensor includes determining that calibration is viable based on the type of environment.

In some implementations, determining the type of environment of the real-world environment using the surfel representation includes: analyzing the surfel representation or a portion of the surfel representation to identify classifications of surfels in the surfel representation or the portion of the surfel representation; and based on percentages of the classifications of the surfels in the surfel representation or the portion of the surfel representation, determining a type of environment from multiple types of environments.

Other embodiments of these aspects include corresponding systems, apparatus, and computer programs encoded on computer storage devices, configured to perform the actions of the methods. A system of one or more computers can be so configured by virtue of software, firmware, hardware, or a combination of them installed on the system that, in operation, cause the system to perform the actions. One or more computer programs can be so configured by virtue having instructions that, when executed by data processing apparatus, cause the apparatus to perform the actions.

Particular embodiments of the subject matter described in this specification can be implemented so as to realize one or more of the following advantages. Using a surfel representation to combine the existing data and the new sensor data can be particularly efficient. Using techniques described in this specification, a system can quickly integrate new sensor data with the data in the surfel map to generate a representation that is also a surfel map. This process is especially time- and memory-efficient because surfels require relatively little bookkeeping, as each surfel is an independent entity. Existing systems that rely, e.g., on a 3D mesh cannot integrate sensor data as seamlessly because if the system moves one particular vertex of the mesh, then the entire mesh is affected; different vertices might cross over each other, yielding a crinkled mesh that that must be untangled.

Moreover, numerous advantages can be realized by using a filtered surfel map for one or more of navigation, localization, and calibration. For example, the disclosed system can generate a filtered surfel map that only includes or depicts surfels having a sufficient level of reliability. The surfels in the filtered surfel map may be those that represent objects that are unlikely to change positions and/or appearances over time. As such, navigation, localization, and calibration accuracy can be improved due to the improved reliability of the surfel map that is being used to perform these functions. For example, the on-board system may compare collected sensor data corresponding to a particular area in the environment to only those surfels that remain in the filtered surfel map to more accurately identify a location for the vehicle. Accordingly, the likelihood of errors that might otherwise be introduced due to objects in the environment changing position, size, and/or shape can be significantly reduced. Similarly, errors that might otherwise be introduced to objects having to fine a structure can be significantly reduced.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 2A is an illustration of an example environment.
FIG. 5A is a diagram illustrating an example environment map of at least a portion of the environment of FIG. 4.

DETAILED DESCRIPTION

Figure 1:
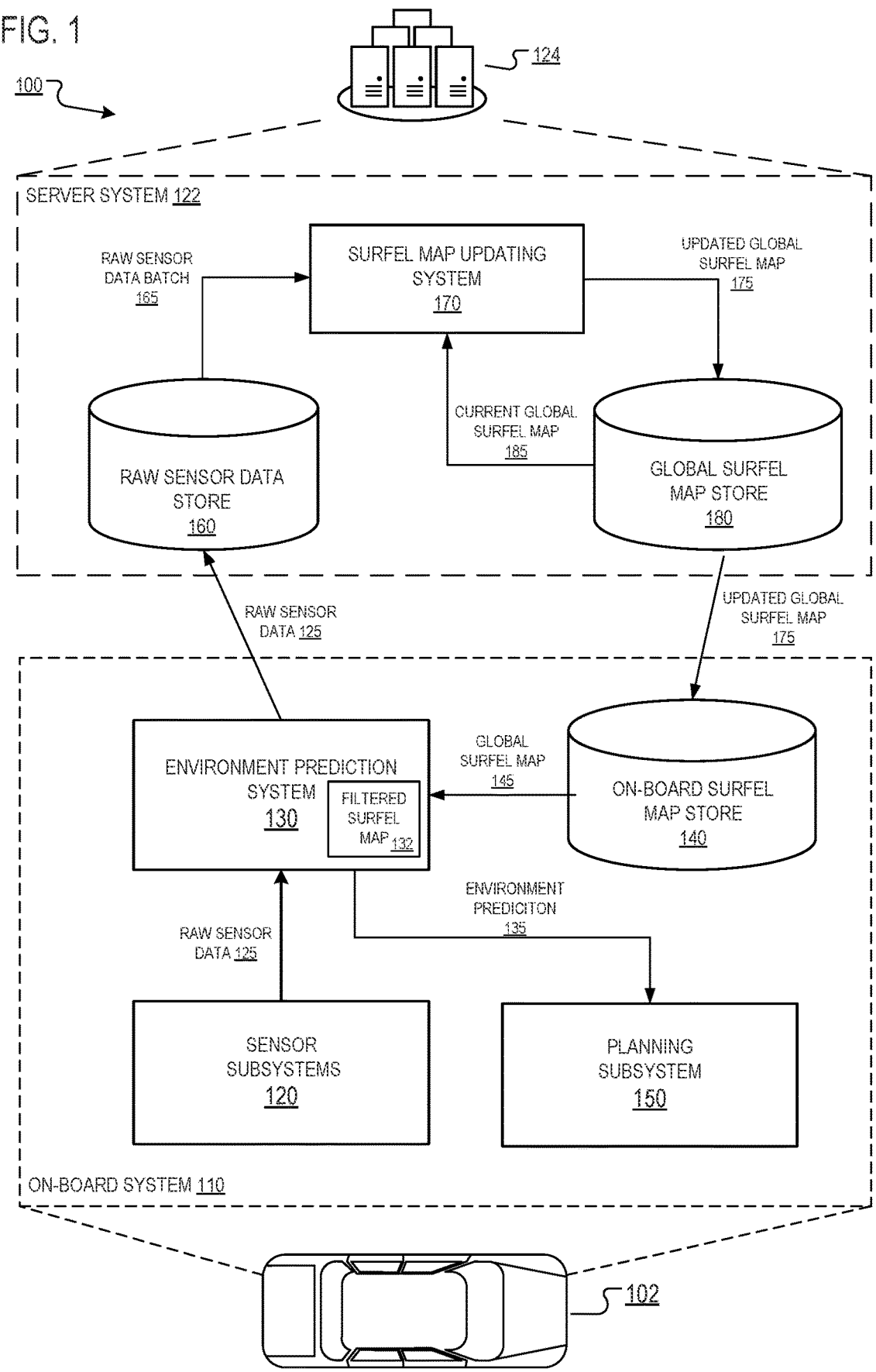
FIG. 1 is a diagram of an example system.

This specification describes how a vehicle, e.g. an autonomous or semi-autonomous vehicle, can modify a surfel map that represents a real-world environment to remove or hide unreliable portions of the surfel map. The resulting modified surfel map can be used to improve the operation of the vehicle in the environment, by, for example, improving the accuracy of the perceived location of the vehicle in the environment, improving the accuracy of perceived locations of objects in the environment, and improving the calibration accuracy of various sensors of a navigation system of the vehicle. Moreover, having been simplified with respect to the surfel map, the modified surfel map can reduce the amount of sensor data required to be collected and, relatedly, the processing requirements on the vehicle's navigation system.

As an example, the navigation system of the vehicle may access a surfel map corresponding to a particular section of a road that the vehicle is currently traveling along. The navigation system may proceed to hide all surfels in the surfel map that are associated with a type of object that is deemed unreliable. For example, the navigation system may hide any surfels that have been tagged as representing a plant, a person, an animal, or a vehicle. The navigation system may use the resulting modified surfel map to determine what sensor data to collect, and/or a subset of collected sensor data that is required to be analyzed. For example, the navigation system may only collect sensor data in a direction that corresponds to one or more objects having representations in the modified surfel map. Similarly, the navigation system may only process sensor data corresponding to one or more objects having representations in the modified surfel map.

In this specification, a surfel is data that represents a two-dimensional surface that corresponds to a particular three-dimensional coordinate system in an environment. A surfel includes data representing a position and an orientation of the two-dimensional surface in the three-dimensional coordinate system. The position and orientation of a surfel can be defined by a corresponding set of coordinates. For example, a surfel can be defined by spatial coordinates, e.g., (x,y,z) defining a particular position in a three-dimensional coordinate system, and orientation coordinates, e.g., (pitch, yaw, roll) defining a particular orientation of the surface at the particular position. As another example, a surfel can be defined by spatial coordinates that define the particular position in a three-dimensional coordinate system and a normal vector, e.g., a vector with a magnitude of 1, that defines the orientation of the surface at the particular position. The location of a surfel can be represented in any appropriate coordinate system. In some implementations, a system can divide the environment being modeled to include volume elements (voxels) and generate at most one surfel for each voxel in the environment that includes a detected object. In some other implementations, a system can divide the environment being modeled into voxels, where each voxel can include multiple surfels; this can allow each voxel to represent complex surfaces more accurately.

A surfel can also optionally include size and shape parameters, although often all surfels in a surfel map have the same size and shape. A surfel can have any appropriate shape. For example, a surfel can be a square, a rectangle, an ellipsoid, or a two-dimensional disc, to name just a few examples. In some implementations, different surfels in a surfel map can have different sizes, so that a surfel map can have varying levels of granularity depending on the environment described by the surfel map; e.g., large surfels can corresponds to large, flat areas of the environment, while smaller surfels can represent areas of the environment that require higher detail.

In this specification, a surfel map is a collection of surfels that each correspond to a respective location in the same environment. The surfels in a surfel map collectively represent the surface detections of objects in the environment. In some implementations, each surfel in a surfel map can have additional data associated with it, e.g., one or more labels describing the surface or object characterized by the surfel. As a particular example, if a surfel map represents a portion of a city block, then each surfel in the surfel map can have a semantic label identifying the object that is being partially characterized by the surfel, e.g., "streetlight," "stop sign," "mailbox," etc.

A surfel map can characterize a real-world environment, e.g., a particular portion of a city block in the real world, or a simulated environment, e.g., a virtual intersection that is used to simulate autonomous driving decisions to train one or more machine learning models. As a particular example, a surfel map characterizing a real-world environment can be generated using sensor data that has been captured by sensors operating in the real-world environment, e.g., sensors on-board a vehicle navigating through the environment. In some implementations, an environment can be partitioned into multiple three-dimensional volumes, e.g., a three-dimensional grid of cubes of equal size, and a surfel map characterizing the environment can have at most one surfel corresponding to each volume.

After the surfel map has been generated, e.g., by combining sensor data gathered by multiple vehicles across multiple trips through the real-world, one or more systems on-board a vehicle can receive the generated surfel map. Then, when navigating through a location in the real world that is represented by the surfel map, the vehicle can process the surfel map along with real-time sensor measurements of the environment in order to make better driving decisions than if the vehicle were to rely on the real-time sensor measurements alone.

FIG. 1 is a diagram of an example system 100. The system 100 can include multiple vehicles, each with a respective on-board system. For simplicity, a single vehicle 102 and its on-board system 110 is depicted in FIG. 1. The system 100 also includes a server system 122 which every vehicle in the system 100 can access.

The vehicle 102 in FIG. 1 is illustrated as an automobile, but the on-board system 110 can be located on-board any appropriate vehicle type. The vehicle 102 can be a fully autonomous vehicle that determines and executes fully-autonomous driving decisions in order to navigate through an environment. The vehicle 102 can also be a semi-autonomous vehicle that uses predictions to aid a human driver. For example, the vehicle 102 can autonomously apply the brakes if a prediction indicates that a human driver is about to collide with an object in the environment, e.g., an object or another vehicle represented in a surfel map. The on-board system 110 includes one or more sensor subsystems 120. The sensor subsystems 120 include a combination of components that receive reflections of electromagnetic radiation, e.g., lidar systems that detect reflections of laser light, radar systems that detect reflections of radio waves, and camera systems that detect reflections of visible light.

The sensor data generated by a given sensor generally indicates a distance, a direction, and an intensity of reflected radiation. For example, a sensor can transmit one or more pulses of electromagnetic radiation in a particular direction and can measure the intensity of any reflections as well as the time that the reflection was received. A distance can be computed by determining how long it took between a pulse and its corresponding reflection. The sensor can continually sweep a particular space in angle, azimuth, or both. Sweeping in azimuth, for example, can allow a sensor to detect multiple objects along the same line of sight.

The sensor subsystems 120 or other components of the vehicle 102 can also classify groups of one or more raw sensor measurements from one or more sensors as being measures of an object of a particular type. A group of sensor measurements can be represented in any of a variety of ways, depending on the kinds of sensor measurements that are being captured. For example, each group of raw laser sensor measurements can be represented as a three-dimensional point cloud, with each point having an intensity and a position. In some implementations, the position is represented as a range and elevation pair. Each group of camera sensor measurements can be represented as an image patch, e.g., an RGB image patch.

Once the sensor subsystems 120 classify one or more groups of raw sensor measurements as being measures of a respective object of a particular type, the sensor subsystems 120 can compile the raw sensor measurements into a set of raw sensor data 125, and send the raw sensor data 125 to an environment prediction system 130.

The on-board system 110 also includes an on-board surfel map store 140 that stores a global surfel map 145 of the real-world. The global surfel map 145 is an existing surfel map that has been generated by combining sensor data captured by multiple vehicles navigating through the real world.

Generally, every vehicle in the system 100 can use the same global surfel map 145. In some cases, different vehicles in the system 100 can use different global surfel maps 145, e.g., when some vehicles have not yet obtained an updated version of the global surfel map 145 from the server system 122. The global surfel map 145 may correspond to a particular environment. For example, the global surfel map 145 may be a map for a particular road, a section of a particular road, a particular direction of travel on a particular road, a particular direction of travel for a section of a particular road, etc.

Each surfel in the global surfel map 145 can have associated data that encodes multiple classes of semantic information for the surfel. For example, for each of the classes of semantic information, the surfel map can have one or more labels characterizing a prediction for the surfel corresponding to the class, where each label has a corresponding probability. As a particular example, each surfel can have multiple labels, with associated probabilities, predicting the type of the object characterized by the surfel, e.g., "pole" with probability 0.8, "street sign" with probability 0.15, and "fire hydrant" with probability 0.05.

The environment prediction system 130 can receive the global surfel map 145 and combine it with the raw sensor data 125 to generate an environment prediction 135. The environment prediction 135 includes data that characterizes a prediction for the current state of the environment, including predictions for an object or surface at one or more locations in the environment.

In some cases, the environment prediction system 130 modifies the global surfel map 145 to generate a filtered surfel map 132. The environment prediction system 130 may generate the filtered surfel map 132 by, for example, filtering (e.g., removing or hiding) surfels in the global surfel map 145 that are determined to be unreliable. Surfels may be considered unreliable if they are associated with a particular type of object, e.g., a type of object that frequently changes positions, changes appearance, or has too fine a structure (e.g., leaves of a tree). For example, the environment prediction system 130 may generate the filtered surfel map 132 by hiding any surfels in the global surfel map 145 that are associated with objects classified as plants, vehicles, equipment, animals, persons, etc. Surfels may similarly be considered unreliable if they are associated with greater than a threshold level of uncertainty. For example, the environment prediction system 130 may generate the filtered surfel map 132 by removing any surfels in the global surfel map 145 that have a classification confidence that is below 0.85.

In some cases, as described in more detail below, determining what surfels to filter from the global surfel map 145 to generate the filtered surfel map 132 may be based on the location of the vehicle 102. Specifically, identifying what surfels that the environment prediction system 130 should remove may be based on the type of environment that the vehicle 102 is navigating through. For example, if the vehicle 102 is traveling on a four-lane road, the environment prediction system 130 may remove any surfels corresponding to plants (e.g., trees, bushes, etc.). However, if the vehicle 102 is traveling along a two-lane road in a heavily forested area, the environment prediction system 130 may refrain from removing or hiding any surfels corresponding to plants (e.g., trees, bushes, etc.). In this example, the environment prediction system 130 may further determine that no surfels should be removed or hidden from the global surfel map 145 when the vehicle 102 is traveling through a heavily forested area.

In some cases, as described in more detail below, determining what surfels to filter from the global surfel map 145 to generate the filtered surfel map 132 may be based on the certain conditions of the environment that the vehicle 102 is navigating through. For example, if the raw sensor data 125 of the sensors subsystems 120 indicates that it is currently snowing in the environment that the vehicle 102 is traveling in, the environment prediction system 130 may remove surfels corresponding to sidewalks to address the accumulation of snow on the sidewalk and the resulting errors that may arise from such snow accumulation (e.g., localization errors, calibration errors, etc.).

In generating the filtered surfel map 132, the environment prediction system 130 can, for example, improve localization accuracy of the vehicle 102 in the environment and/or the calibration accuracy of sensors in the sensor subsystems 120. Notably, the environment prediction system 130 may generate the environment prediction 135 using the filtered surfel map 132 (e.g., in place of the global surfel map 145).

Therefore, the environment prediction 135 may be made based on only a subset of surfels in the global surfel map 145 that are determined to be sufficiently reliable. As an example, the environment prediction 135 may be an indication of the estimated current location of the vehicle 102 in the environment. This estimated location may be more accurate than, for example, an estimated location that was determined using the global surfel map 145 since distances for localization will be calculated using surfels in the filtered surfel map 132 that are more likely to not change position (e.g., road signs, road markers, barriers, sidewalks, etc.).

Sensor calibration can similarly be improved using the filtered surfel map 132. For example, instead of randomly comparing observed point distances to corresponding expected distances in the global surfel map 145, the on-board system 110 can obtain point distances on specific area in the environment that correspond to surfels in the filtered surfel map 132. Because these surfels are more reliable, calibration accuracy of sensors in the sensor subsystems (e.g., lidar sensors, time-of-flight sensors, cameras, etc.) can be improved. Calibration may include the updating of positions of the sensors, settings of the sensors, or synchronization between two or more sensors (e.g., modifying the position of a camera with respect to a lidar coordinate system).

In some cases, only a portion of the global surfel map 145 is modified to generate the filtered surfel map 132. For example, the environment prediction system 130 may filter (e.g., remove or hide) particular surfels in the global surfel map 145 that correspond to the environment that vehicle 102 is currently navigating through or is expected to navigate through. For example, the environment prediction system 130 may filter out particular surfels from a portion of the global surfel map 145 that corresponds to an area defined by a 100 ft behind the current location of the vehicle 102, 200 ft to the right and left of the current location of the vehicle 102, and 0.5 miles in front of the vehicle 102.

Similarly, the filtered surfel map 132 may be a map of only a portion of the global surfel map 145. For example, the filtered surfel map 132 may be a map for an area defined by a 100 ft behind the current location of the vehicle 102, 200 ft to the right and left of the current location of the vehicle 102, and 0.5 miles in front of the vehicle 102. The environment prediction system 130 may generate new filtered surfel maps from the global surfel map 145 and/or the immediately preceding surfel map as the vehicle 102 continues to navigate (e.g., the environment prediction system 130 may start generating an updated surfel map upon detecting that the vehicle 0.25 miles from a front edge of an area corresponding to the current filtered surfel map).

In some cases, the server system 122 generates the filtered surfel map 132. For example, the server system 122 may filter different portions of the global surfel map 145 to generate a filtered surfel map 132. The server system 122 may filter different portions of the global surfel map 145 differently, e.g., depending on the a type of environment for each of the portions. The server system 122 may proceed to send the filtered surfel map 132 to the on-board surfel map store 140.

The raw sensor data 125 might show that the environment through which the vehicle 102 is navigating has changed. In some cases, the changes might be large and discontinuous, e.g., if a new building has been constructed or a road has been closed for construction since the last time the portion of the global surfel map 145 or the filtered surfel map 132 corresponding to the environment has been updated. In some other cases, the changes might be small and continuous, e.g., if a bush grew by an inch or a leaning pole increased its tilt. In either case, the raw sensor data 125 can capture these changes to the world, and the environment prediction system 130 can use the raw sensor data to update the data characterizing the environment stored in the global surfel map 145 or the filtered surfel map 132 to reflect these changes in the environment prediction 135.

For one or more objects represented in the global surfel map 145 or the filtered surfel map 132, the environment prediction system 130 can use the raw sensor data 125 to determine a probability that the object is currently in the environment. In some implementations, the environment prediction system 130 can use a Bayesian model to generate the predictions of which objects are currently in the environment, where the data in the global surfel map 145 or the filtered surfel map 132 is treated as a prior distribution for the state of the environment, and the raw sensor data 125 is an observation of the environment. The environment prediction system 130 can perform a Bayesian update to generate a posterior belief of the state of the environment, and include this posterior belief in the environment prediction 135. In some implementations, the raw sensor data 125 also has a probability distribution for each object detected by the sensor subsystem 120 describing a confidence that the object is in the environment at the corresponding location; in some other implementations, the raw sensor data 125 includes detected objects with no corresponding probability distribution.

For example, if the global surfel map 145 or the filtered surfel map 132 includes a representation of a particular object, and the raw sensor data 125 includes a strong detection of the particular object in the same location in the environment, then the environment prediction 135 can include a prediction that the object is in the location with high probability, e.g. 0.95 or 0.99. If the global surfel map 145 or the filtered surfel map 132 does not include the particular object, but the raw sensor data 125 includes a strong detection of the particular object in the environment, then the environment prediction 135 might include a weak prediction that the object is in the location indicated by the raw sensor data 125, e.g. predict that the object is at the location with probability of 0.5 or 0.6. If the global surfel map 145 or the filtered surfel map 132 does include the particular object, but the raw sensor data 125 does not include a detection of the object at the corresponding location, or includes only a weak detection of the object, then the environment prediction 135 might include a prediction that has moderate uncertainty, e.g. assigning a 0.7 or 0.8 probability that the object is present.

That is, the environment prediction system 130 might assign more confidence to the correctness of the global surfel map 145 or the filtered surfel map 132 than to the correctness of the raw sensor data 125. In some other implementations, the environment prediction system 130 might assign the same or more confidence to the correctness of the raw sensor data 125 than to the correctness of the global surfel map 145 or the filtered surfel map 132. In either case, the environment prediction system 130 does not treat the raw sensor data 125 or the global surfel map 145 or the filtered surfel map 132 as a ground-truth, but rather associates uncertainty with both in order to combine them. Approaching each input in a probabilistic manner can generate a more accurate environment prediction 135, as the raw sensor data 125 might have errors, e.g., if the sensors in the sensor subsystems 120 are miscalibrated, and the global surfel map 145 or the filtered surfel map 132 might have errors, e.g., if the state of the world has changed.

In some implementations, the environment prediction 135 can also include a prediction for each class of semantic information for each object in the environment. For example, the environment prediction system 130 can use a Bayesian model to update the associated data of each surfel in the global surfel map 145 or the filtered surfel map 132 using the raw sensor data 125 in order to generate a prediction for each semantic class and for each object in the environment. For each particular object represented in the global surfel map 145 or the filtered surfel map 132, the environment prediction system 130 can use the existing labels of semantic information of the surfels corresponding to the particular object as a prior distribution for the true labels for the particular object. The environment prediction system 130 can then update each prior using the raw sensor data 125 to generate posterior labels and associated probabilities for each class of semantic information for the particular object. In some such implementations, the raw sensor data 125 also has a probability distribution of labels for each semantic class for each object detected by the sensor subsystem 120; in some other such implementations, the raw sensor data 125 has a single label for each semantic class for each detected object.

Continuing the previous particular example, where a particular surfel characterizes a pole with probability 0.8, a street sign with probability 0.15, and fire hydrant with probability 0.05, if the sensor subsystems 120 detect a pole at the same location in the environment with high probability, then the Bayesian update performed by the environment prediction system 130 might generate new labels indicating that the object is a pole with probability 0.85, a street sign with probability 0.12, and fire hydrant with probability 0.03. The new labels and associated probabilities for the object are added to the environment prediction 135.

Similarly, where a particular surfel characterizes a barrier with probability 0.92, and a street sign with probability 0.08, if the sensor subsystems 120 detect a barrier at the same location in the environment with high probability, then the Bayesian update performed by the environment prediction system 130 might generate new labels indicating that the object is a barrier with probability 0.95, and a street sign with probability 0.05. The new labels and associated probabilities for the object are added to the environment prediction 135.

The environment prediction system 130 can provide the environment prediction 135 to a planning subsystem 150, which can use the environment prediction system 130 to make autonomous driving decisions, e.g., generating a planned trajectory for the vehicle 102 through the environment.

The planning subsystem 150 can make use of a barrier logic subsystem 152 to determine whether a barrier is likely to prevent detected pedestrians from entering the road. As an example, the barrier logic subsystem can determine that a barrier is sufficiently likely to prevent a detected pedestrian from entering a roadway on which the vehicle 102 is traveling or from crossing a previously determined path for the vehicle 102. The planning subsystem 150 can thus determine that no changes should be made to planned path for the vehicle 102, despite the presence of detected pedestrians.

The environment prediction system 130 can also provide the raw sensor data 125 to a raw sensor data store 160 located in the server system 122.

The server system 122 is typically hosted within a data center 124, which can be a distributed computing system having hundreds or thousands of computers in one or more locations.

The server system 122 includes a raw sensor data store 160 that stores raw sensor data generated by respective vehicles navigating through the real world. As each vehicle captures new sensor data characterizing locations in the real world, each vehicle can provide the sensor data to the server system 122. The server system 122 can then use the sensor data to update the global surfel map that every vehicle in the system 100 uses. That is, when a particular vehicle discovers that the real world has changed in some way, e.g., construction has started at a particular intersection or a street sign has been taken down, the vehicle can provide sensor data to the server system 122 so that the rest of the vehicles in the system 100 can be informed of the change.

The server system 122 also includes a global surfel map store 180 that maintains the current version of the global surfel map 185.

A surfel map updating system 170, also hosted in the server system 122, can obtain the current global surfel map 185 and a batch of raw sensor data 165 from the raw sensor data store 160 in order to generate an updated global surfel map 175. In some implementations, the surfel map updating system 170 updates the global surfel map at regular time intervals, e.g., once per hour or once per day, obtaining a batch of all of the raw sensor data 165 that has been added to the raw sensor data store 160 since the last update. In some other implementations, the surfel map updating system 170 updates the global surfel map whenever a new raw sensor data 125 is received by the raw sensor data store 160.

In some implementations, the surfel map updating system 170 generates the updated global surfel map 175 in a probabilistic way.

In some such implementations, for each measurement in the batch of raw sensor data 165, the surfel map updating system 170 can determine a surfel in the current global surfel map 185 corresponding to the location in the environment of the measurement, and combine the measurement with the determined surfel. For example, the surfel map updating system 170 can use a Bayesian model to update the associated data of a surfel using a new measurement, treating the associated data of the surfel in the current global surfel map 185 as a prior distribution. The surfel map updating system 170 can then update the prior using the measurement to generate posterior distribution for the corresponding location. This posterior distribution is then included in the associated data of the corresponding surfel in the updated global surfel map 175.

If there is not currently a surfel at the location of a new measurement, then the surfel map updating system 170 can generate a new surfel according to the measurement.

In some such implementations, the surfel map updating system 170 can also update each surfel in the current global surfel map 185 that did not have a corresponding new measurement in the batch of raw sensor data 165 to reflect a lower certainty that an object is at the location corresponding to the surfel. In some cases, e.g., if the batch of raw sensor data 165 indicates a high confidence that there is not an object at the corresponding location, the surfel map updating system 170 can remove the surfel from the updated global surfel map 175 altogether. In some other cases, e.g., when the current global surfel map 185 has a high confidence that the object characterized by the surfel is permanent and therefore that the lack of a measurement of the object in the batch of raw sensor data 165 might be an error, the surfel map updating system 170 might keep the surfel in the updated global surfel map 175 but decrease the confidence of the updated global surfel map 175 that an object is at the corresponding location.

After generating the updated global surfel map 175, the surfel map updating system 170 can store it in the global surfel map store 180, replacing the stale global surfel map 185. Each vehicle in the system 100 can then obtain the updated global surfel map 175 from the server system 122, e.g., through a wired or wireless connection, replacing the stale version with the retrieved updated global surfel map 175 in the on-board surfel map store 140. In some implementations, each vehicle in the system 100 retrieves an updated global surfel map 175 whenever the global surfel map is updated and the vehicle is connected to the server system 122 through a wired or wireless connection. In some other implementations, each vehicle in the system 100 retrieves the most recent updated global surfel map 175 at regular time intervals, e.g., once per day or once per hour.

FIG. 2A is an illustration of an example environment 200. The environment 200 is depicted from the point of view of a sensor on-board a vehicle navigating through the environment 200. The environment 200 includes a sign 202, a bush 204, and an overpass 206. The on-board system 110 described in FIG. 1 might classify the bush 204 as a barrier or a barrier with a bush label.

Figure 2B:
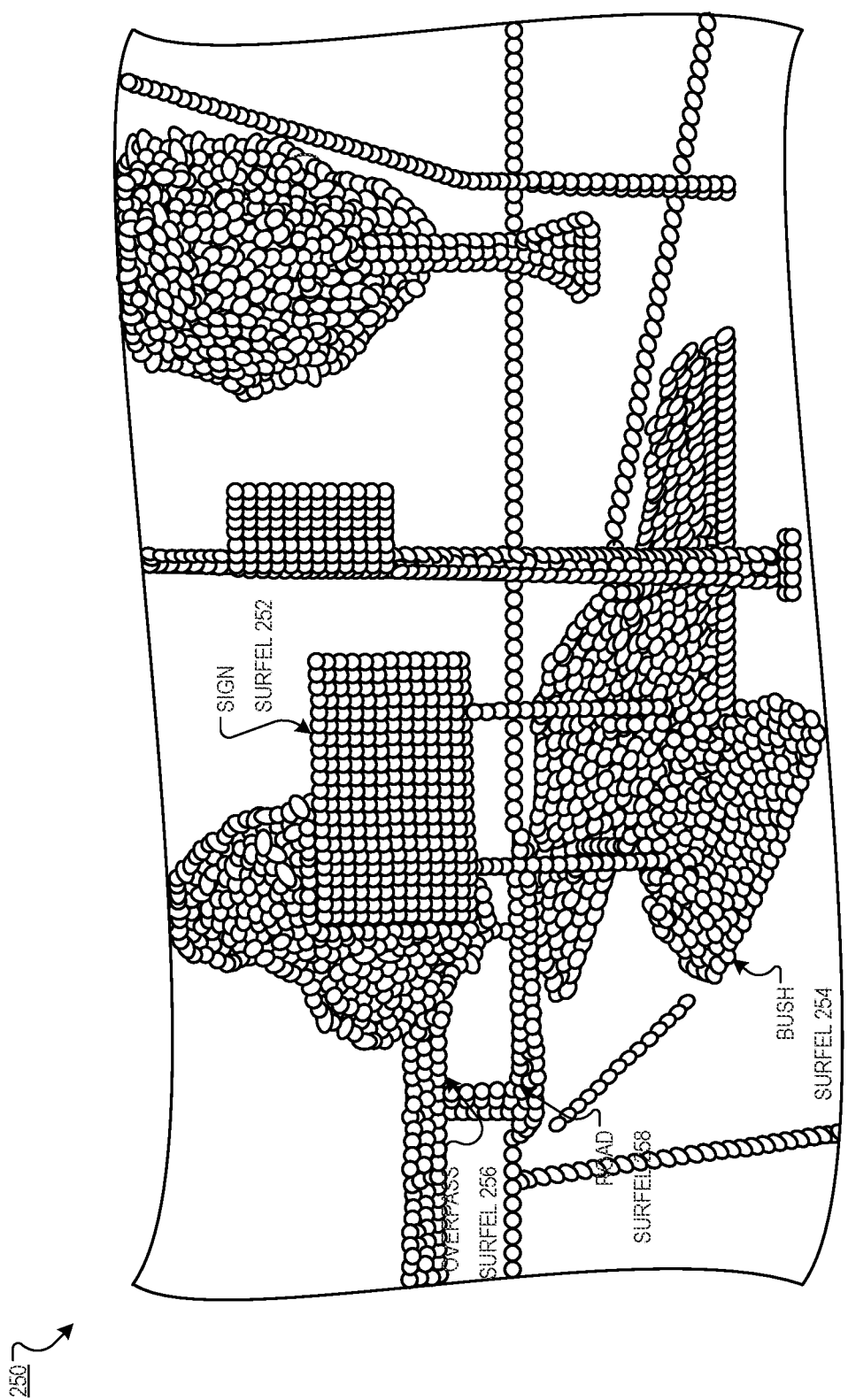
FIG. 2B is an illustration of an example surfel map of the environment of FIG. 2A.

FIG. 2B is an illustration of an example surfel map 250 of the environment 200 of FIG. 2A.

Each surfel in the example surfel map 250 is represented by a disk, and defined by three coordinates (latitude, longitude, altitude), that identify a position of the surfel in a common coordinate system of the environment 200 and by a normal vector that identifies an orientation of the surfel. For example, each voxel can be defined to be the disk that extends some radius, e.g., 1, 10, 25, or 100 centimeters, around the (latitude, longitude, altitude) coordinate. In some other implementations, the surfels can be represented as other two-dimensional shapes, e.g. ellipsoids or squares.

The environment 200 is partitioned into a grid of equal-sized voxels. Each voxel in the grid of the environment 200 can contain at most one surfel, where, e.g., the (latitude, longitude, altitude) coordinate of each surfel defines the voxel that the surfel occupies. That is, if there is a surface of an object at the location in the environment corresponding to a voxel, then there can be a surfel characterizing the surface in the voxel; if there is not a surface of an object at the location, then the voxel is empty. In some other implementations, a single surfel map can contain surfels of various different sizes that are not organized within a fixed spatial grid.

Each surfel in the surfel map 250 has associated data characterizing semantic information for the surfel. For example, as discussed above, for each of multiple classes of semantic information, the surfel map can have one or more labels characterizing a prediction for the surfel corresponding to the class, where each label has a corresponding probability. As a particular example, each surfel can have multiple labels, with associated probabilities, predicting the type of the object characterized by the surfel. As another particular example, each surfel can have multiple labels, with associated probabilities, predicting the permanence of the object characterized by the surfel; for example, a "permanent" label might have a high associated probability for surfels characterizing buildings, while the "permanent" label might have a high probability for surfels characterizing vegetation. Other classes of semantic information can include a color, reflectivity, or opacity of the object characterized by the surfel.

For example, the surfel map 250 includes a sign surfel 252 that characterizes a portion of the surface of the sign 202 depicted in FIG. 2A. The sign surfel 252 might have labels predicted that the type of the object characterized by the sign surfel 252 is "sign" with probability 0.9 and "billboard" with probability 0.1. Because street signs are relatively permanent objects, the "permanent" label for the sign surfel 252 might be 0.95. The sign surfel 252 might have color labels predicting the color of the sign 202 to be "green" with probability 0.8 and "blue" with probability 0.2. Because the sign 202 is completely opaque and reflects some light, an opacity label of the sign surfel 252 might predict that the sign is "opaque" with probability 0.99 and a reflectivity label of the sign surfel 252 might predict that the sign is "reflective" with probability 0.6.

As another example, the surfel map 250 includes a bush surfel 254 that characterizes a portion of the bush 204 depicted in FIG. 2A. The bush surfel 254 may be considered a barrier surfel when the bush is considered a barrier. The bush surfel 254 might have labels predicted that the type of the object characterized by the bush surfel 254 is "barrier" or "bush" with probability 0.75 and "tree" with probability 0.25. Because bushes can grow, be trimmed, and die with relative frequency, the "permanent" label for the bush surfel 254 might be 0.2. The bush surfel 254 might have color labels predicting the color of the bush 204 to be "green" with probability 0.7 and "yellow" with probability 0.3. Because the bush 204 is not completely opaque and does not reflect a lot of light, an opacity label of the bush surfel 254 might predict that the sign is "opaque" with probability 0.7 and a reflectivity label of the sign surfel 252 might predict that the sign is "reflective" with probability 0.4. Note that, for any latitude and longitude in the environment 200, i.e., for any given (latitude, longitude) position in a plane running parallel to the ground of the environment 200, the surfel map 250 can include multiple different surfels each corresponding to a different altitude in the environment 200, as defined by the altitude coordinate of the surfel. This represents a distinction between some existing techniques that are "2.5-dimensional," i.e., techniques that only allow a map to contain a single point at a particular altitude for any given latitude and longitude in a three-dimensional map of the environment. These existing techniques can sometimes fail when an environment has multiple objects at respective altitudes at the same latitude and longitude in the environment. For example, such existing techniques would be unable to capture both the overpass 206 in the environment 200 and the road underneath the overpass 205. The surfel map, on the other hand, is able to represent both the overpass 206 and the road underneath the overpass 206, e.g., with an overpass surfel 256 and a road surfel 258 that have the same latitude coordinate and longitude coordinate but a different altitude coordinate.

Figure 3:
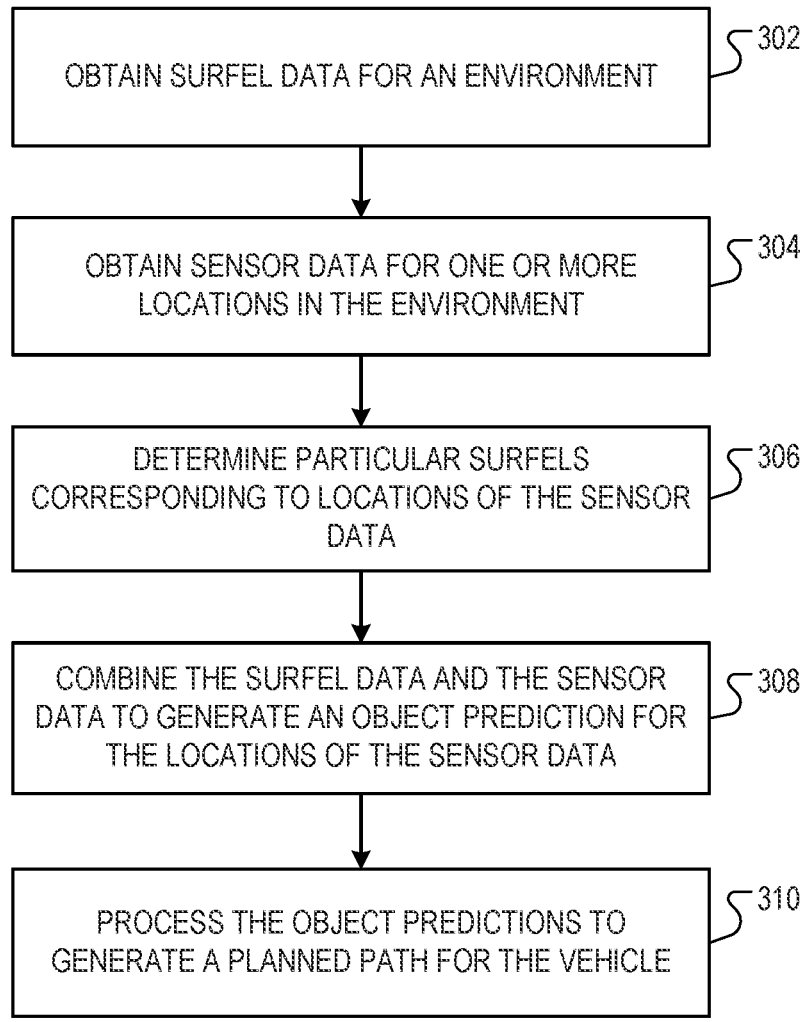
FIG. 3 is a flow diagram of an example process for combining surfel data and sensor data.

FIG. 3 is a flow diagram of an example process 300 for combining surfel data and sensor data. For convenience, the process 300 will be described as being performed by a system of one or more computers located in one or more locations. For example, an environment prediction system, e.g., the environment prediction system 130 depicted in FIG. 1, appropriately programmed in accordance with this specification, can perform the process 300.

The system obtains surfel data for an environment (step 302). The surfel data includes multiple surfels that each correspond to a respective different location in the environment. Each surfel in the surfel data can also have associated data. The associated data can include a certainty measure that characterizes a likelihood that the surface represented by the surfel is at the respective location of the surfel in the environment. That is, the certainty measure is a measure of how confident the system is that the surfel represents a surface that is actually in the environment at the current time point. For example, a surfel in the surfel map that represents a surface of a concrete barrier might have a relatively high certainty measure, because it is unlikely that the concrete barrier was removed between the point in time when the surfel map was created and a current time that the vehicle is navigating through the environment. As another example, a surfel in the surfel map that represents a surface of a political campaign yard sign might have a relatively low certainty measure, because political campaign yard signs are usually temporary and therefore it is relatively likely that the yard sign has been removed between the time point at which the surfel map was created and the current time point.

The associated data of each surfel can also include a respective class prediction for each of one or more classes of semantic information for the surface represented by the surfel. In some implementations, the surfel data is represented using a voxel grid, where each surfel in the surfel data corresponds to a different voxel in the voxel grid.

In some cases, the system filters the surfel data to remove or hide one or more surfels from the surfel data. For example, with respect to FIG. 1, the environment prediction system 130 may remove or hide surfels from the global surfel map 145 that are associated with particular types of objects, and/or surfels that have corresponding confidence that does not meet a threshold level of confidence. By filtering out these surfels, modified surfel data can be generated that includes data that is more reliable. That is the modified surfel data is more likely to match observations made using sensors of the sensor subsystem 120 as the vehicle 102 navigates through the environment.

The system obtains sensor data for one or more locations in the environment (step 304). The sensor data has been captured by one or more sensors of a vehicle navigating in the environment, e.g., the sensor subsystems 120 of the vehicle 102 depicted in FIG. 1.

In some implementations, the surfel data has been generated from data captured by one or more vehicles navigating through the environment at respective previous time points, e.g., the same vehicle that captured the sensor data and/or other vehicles.

The system determines one or more particular surfels corresponding to respective locations of the sensor data (step 306). For example, for each measurement in the sensor data, the system can select a particular surfel that corresponds to the same location as the measurement, if one exists in the surfel data. For example, if laser data indicates that an object is three meters away in a particular direction, the system can refer to a surfel map to try and identify the corresponding surfel. That is, the system can use the surfel map to determine that a surfel that is substantially three meters away in substantially the same direction is labelled as part of a road barrier.

The system combines the surfel data and the sensor data to generate an object prediction for each of the one or more locations of the sensor data (step 308). The object prediction for a particular location in the environment can include an updated certainty measure that characterizes likelihood that there is a surface of an object at the particular location.

In some implementations, the system performs a Bayesian update to generate the object prediction from the surfel data and sensor data. That is, the system can, for each location, determine that the associated data of the surfel corresponding to the location is a prior distribution for the object prediction, and update the associated data using the sensor data to generate the object prediction as the posterior distribution.

As a particular example, for each class of information in the surfel data to be updated, including the object prediction and/or one or more classes of semantic information, the system can update the probability associated with the class of information using Bayes' theorem:

$$P(H|E) = \frac{P(E|H)}{P(E)} \cdot P(H),$$

where H is the class of information (e.g., whether the object at the location is vegetation) and E is the sensor data. Here, P(H) is the prior probability corresponding to the class of information in the surfel data, and P(E|H) is probability of the sensors producing that particular sensor data given that the class of information is true. Thus, P(H|E) the posterior probability of the for the class of information. In some implementations, the system can execute this computation independently for each class of information.

For example, the surfel data might indicate a low likelihood that there is a surface of an object at the particular location; e.g., there may not be a surfel in the surfel data that corresponds to the particular location, or there may be a surfel in the surfel data that corresponds to the particular location that has a low certainty measure, indicating a low confidence that there is a surface at the particular location. The sensor data, on the other hand, might indicate a high likelihood that there is a surface of an object at the particular location, e.g., if the sensor data includes a strong detection of an object at the particular location.

In some such cases, the generated object prediction for the particular location might indicate a high likelihood that there is a temporary object at the particular location, e.g., debris on the road or a trash can moved into the street. As a particular example, the object prediction might include a high uncertainty score, indicating a high likelihood that there is an object at the location, and a high 'temporary' class score corresponding to a 'temporary' semantic label, indicating a high likelihood that the object is temporary. In some other such cases, the generated object prediction for the particular location might indicate a low likelihood that there is an object at the particular location, because the system might assign a higher confidence to the surfel data than to the sensor data. That is, the system might determine with a high likelihood that the sensors identified an object at the particular location in error. In some other such cases, the generated object prediction for the particular location might indicate a high likelihood that there is an object at the particular location, because the system might assign a higher confidence to the sensor data than the surfel data. That is, the system might determine with a high likelihood that the surfel data is stale, i.e., that the surfel data reflects a state of the environment at a previous time point but does not reflect the state of the environment at the current time point.

As another example, the surfel data might indicate a high likelihood that there is a surface of an object at the particular location; e.g., there may be a surfel in the surfel data that corresponds to the particular location that has a high certainty measure. The sensor data, on the other hand, might indicate a low likelihood that there is a surface of an object at the particular location, e.g., if the sensor data does not include an detection, or only includes a weak detection, of an object at the particular location.

In some such cases, the generated object prediction for the particular location might indicate a high likelihood that there is an object at the particular location, but that it is occluded from the sensors of the vehicle. As a particular example, if there it is precipitating in the environment at the current time point, the sensors of the vehicle might only measure a weak detection of an object at the limits of the range of the sensors. In some other such cases, the generated object prediction for the location might indicate a high likelihood that there is a reflective object at the location. When an object is reflective, a sensor that measures reflected light, e.g., a LIDAR sensor, can fail to measure a detection of the object and instead measure a detection of a different object in the environment whose reflection is captured off of the reflective object, e.g., a sensor might observe a tree reflected off a window instead of observing the window itself. As a particular example, the object prediction might include a high uncertainty score, indicating a high likelihood that there is an object at the location, and a high 'reflective' class score corresponding to a 'reflectivity semantic label, indicating a high likelihood that the object is reflective. In some other such cases, the generated object prediction for the location might indicate a high likelihood that there is a transparent or semi-transparent object at the location. When an object is transparent, a sensor can fail to measure a detection of the object and instead measure a detection of a different object that is behind the transparent object. As a particular example, the object prediction might include a high uncertainty score, indicating a high likelihood that there is an object at the location, and a low 'opaque' class score corresponding to an 'opacity' semantic label, indicating a high likelihood that the object is transparent.

As another example, the surfel data and the sensor data might "agree." That is, they might both indicate a high likelihood that there is an object at a particular location, or they might both indicate that there is a low likelihood that there is an object at the particular location. In these examples, the object prediction for the particular location can correspond to the agreed-upon state of the world.

In some implementations, the system can use the class predictions for classes of semantic information in the surfel data to generate the object predictions. For example, the system can retrieve the labels previously assigned to an identified surfel that corresponds with a detected object location. The label may indicate that the object is a barrier with 0.91 confidence, and a street sign with 0.09 confidence.

In some implementations, the generated object prediction for each location in the environment also includes an updated class prediction for each of the classes of semantic information that are represented in the surfel data. As a particular example, if a surfel is labeled as "asphalt" with a high probability, and the sensor data captures a measurement directly above the surfel, then the system might determine that the measurement characterizes another object with high probability. On the other hand, if the surfel is labeled as "hedge" with high probability, and the sensor data captures a measurement directly above the surfel, then the system might determine that the measurement characterizes the same hedge, i.e., that the hedge has grown.

In some implementations, the system can obtain multiple sets of sensor data corresponding to respective iterations of the sensors of the vehicle (e.g., spins of the sensor). In some such implementations, the system can execute an update for each set of sensor data in a streaming fashion, i.e., executing an independent update sequentially for each set of sensor data. In some other implementations, the system can use a voting algorithm to execute a single update to the surfel data.

In some implementations, the system can use the surfel data and the sensor data to determine that the object is a barrier and is sufficient to prevent one or more objects from entering a particular road. For example, the on-board system 110 can use the sensor data to verify the dimensions of a barrier and/or a material of a barrier. Based on this information, the on-board system 110 may determine that this barrier is sufficiently likely (greater than 90%, 95%, 97%, etc.) to prevent any pedestrians from entering the roadway, but that large animals may still pose an unacceptable risk (e.g., barrier is unlikely to prevent more than 80%, 85%, 90%, etc. of large animals from entering the roadway).

In some implementations, the system uses the sensor data to identify animate objects in the environment. For example, the on-board system 110 may use LIDAR and image data to identify persons and animals in the environment where the vehicle 102 is driving. The on-board system 110 may track these objects.

In some implementations, generating an object prediction for the locations of the sensor data includes generating a prediction using the surfel data and the sensor data that an animate object will not enter a roadway or otherwise cross a path of travel for the vehicle. For example, continuing with the previous example, the on-board system 110 may determine based on its previous determinations that a barrier is sufficiently likely to prevent a detected pedestrian from entering the roadway that the vehicle 102 is traveling on.

After generating the object predictions, the system can process the object predictions to generate a planned path for the vehicle (step 310). For example, the system can provide the object predictions to a planning subsystem of the system, e.g., the planning subsystem 150 depicted in FIG. 1, and the planning subsystem can generate the planned path. The system can generate the planned path in order to avoid obstacles that are represented in the object predictions. The planning subsystem can also use the class predictions for one or more of the classes of semantic information to make autonomous driving decisions, e.g., by avoiding portions of the road surface that have a likelihood of being icy.

As a particular example, the vehicle may be on a first street and approaching a second street, and a planned path of the vehicle instructs the vehicle to make a right turn onto the second street. The surfel data includes surfels representing a hedge on the left side of the first street, such that the hedge obstructs the sensors of the vehicle from being able to observe oncoming traffic moving towards the vehicle on the second street. Using this existing surfel data, before the vehicle arrives at the second street the planning subsystem might have determined to take a particular position on the first street in order to be able observe the oncoming traffic around the hedge. However, as the vehicle approaches the second street, the sensors capture sensor data that indicates that the hedge has grown. The system can combine the surfel data and the sensor data to generate a new object prediction for the hedge that represents its current dimensions. The planning subsystem can process the generated object prediction to update the planned path so that the vehicle can take a different particular position on the first street in order to be able to observe the oncoming traffic around the hedge.

In some cases, the system compares the surfel data and the sensor data to generate one more other predictions. For example, with respect to FIG. 1, the on-board system 110 can compare the raw sensor data 125 to the filtered surfel map 132 to identify a current location for the vehicle 102 in the environment. Similarly, the on-board system 110 may compare a subset of the raw sensor data 125 to a subset of surfels in the filtered surfel map 132 to calibrate one or more sensors of the sensor subsystems 120.

Figure 4:
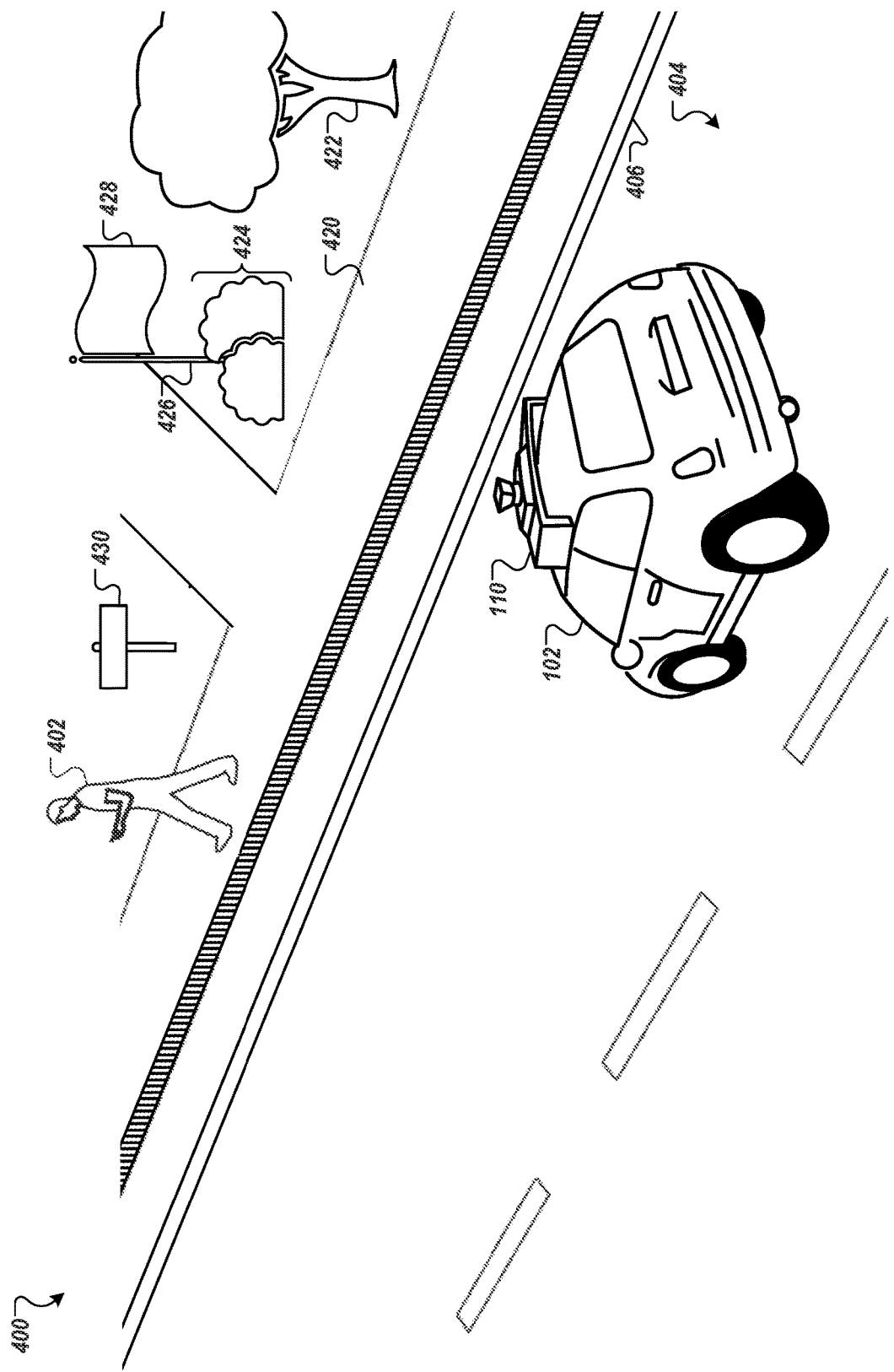
FIG. 4 is a diagram illustrating an example environment.

FIG. 4 is a diagram illustrating an example environment 400. The environment 400 includes a pedestrian 402, a road 404, a sidewalk 420, a tree 422, a grouping of bushes 424, a flag pole 426, a flag 428 secured to the flag pole 426, and a sign 430. The road 404 can include one or more markers, such as a road line 406 that marks an edge of the road 404.

A vehicle 102 is navigating through the environment 400 using an on-board system 110. The vehicle 102 can be a semi-autonomous or a fully autonomous vehicle that determines and executes fully-autonomous driving decisions in order to navigate through the environment 400. The vehicle 102 can also be a semi-autonomous vehicle that uses predictions to aid a human driver. For example, the vehicle 102 can autonomously apply the brakes if a prediction indicates that a human driver is about to collide with an object in the environment 400, e.g., the pedestrian 402, another vehicle traveling on the road 404, etc.

The on-board system 110 can include one or more sensor subsystems. The sensor subsystems can include a combination of components that receive reflections of electromagnetic radiation, e.g., lidar systems that detect reflections of laser light, radar systems that detect reflections of radio waves, and camera systems that detect reflections of visible light. The vehicle 102 is illustrated as an automobile, but the on-board system 110 can be located on-board any appropriate vehicle type.

The sensor data generated by a given sensor of the on-board system 110 generally indicates a distance, a direction, and an intensity of reflected radiation. For example, a sensor of the on-board system 110 can transmit one or more pulses of electromagnetic radiation in a particular direction and can measure the intensity of any reflections as well as the time that the reflection was received. A distance can be computed by determining how long it took between a pulse and its corresponding reflection. The sensor can continually sweep a particular space in angle, azimuth, or both. Sweeping in azimuth, for example, can allow a sensor to detect multiple objects along the same line of sight.

The sensor subsystems of the on-board system 110 or other components of the vehicle 102 can also classify groups of one or more raw sensor measurements from one or more sensors as being measures of an object of a particular type. A group of sensor measurements can be represented in any of a variety of ways, depending on the kinds of sensor measurements that are being captured. For example, each group of raw laser sensor measurements can be represented as a three-dimensional point cloud, with each point having an intensity and a position. In some implementations, the position is represented as a range and elevation pair. Each group of camera sensor measurements can be represented as an image patch, e.g., an RGB image patch.

Once sensor subsystems of the on-board system 110 classify one or more groups of raw sensor measurements as being measures of a respective object of a particular type, the sensor subsystems of the on-board system 110 can compile the raw sensor measurements into a set of raw sensor data, and send the raw data to an environment prediction system, e.g., the environment prediction system 130 shown in FIG. 1.

The on-board system 110 can store a global surfel map, e.g., the global surfel map 145 shown in FIG. 1 and described above. The global surfel map can be an existing surfel map that has been generated by combining sensor data captured by multiple vehicles navigating through the real world. A portion of the global surfel map can correspond to the environment 400, e.g., previously generated by combining sensor data captured by one or more vehicles had navigated through the environment 400. As an example, this global surfel map can include an indication of the road 404, the road 404's markers including the road line 406, and the barrier 408.

Each surfel in the global surfel map can have associated data that encodes multiple classes of semantic information for the surfel. For example, for each of the classes of semantic information, the surfel map can have one or more labels characterizing a prediction for the surfel corresponding to the class, where each label has a corresponding probability. As a particular example, each surfel of the global surfel map can have multiple labels, with associated probabilities, predicting the type of the object characterized by the surfel, e.g. "concrete barrier" with probability 0.8, "road" with probability 0.82, and "road line" with probability 0.91.

The environment prediction system 130 shown in FIG. 1 can receive the global surfel map and combine it with the raw sensor data collected using the on-board system 110 to generate an environment prediction for the environment 400. The environment prediction can include data that characterizes a prediction for the current state of the environment 400, including predictions for an object or surface at one or more locations in the environment 400. The environment prediction can include a location prediction of where the vehicle 102 currently is with respect to the environment 400.

The raw sensor data might show that the environment through which the vehicle 102 is navigating has changed. In some cases, the changes might be large and discontinuous, e.g., if a new building has been constructed or a road has been closed for construction since the last time the portion of the global surfel map corresponding to the environment 400 has been updated. In some other cases, the changes might be small and continuous, e.g., if a bush grew by an inch or a leaning pole increased its tilt. In either case, the raw sensor data can capture these changes to the world, and the environment prediction system 130 shown in FIG. 1 can use the raw sensor data to update the data characterizing the environment 400 stored in the global surfel map to reflect these changes in the environment prediction for the environment 400.

In some implementations, certain changes in the environment 400 as indicated by the raw sensor data are not used to update the data characterizing the environment 400 stored in the global surfel map. For example, temporary objects such as pedestrians, animals, bikes, vehicles, or the like may can be identified and intentionally not be added to the global surfel map due to their high likelihood of moving to different locations over time.

For one or more objects represented in the global surfel map, the environment prediction system 130 shown in FIG. 1 can use the raw sensor data to determine a probability that a given object is currently in the environment 400. In some implementations, the environment prediction system 130 can use a Bayesian model to generate the predictions of which objects are currently in the environment 400, where the data in the global surfel map is treated as a prior distribution for the state of the environment 400, and the raw sensor data is an observation of the environment 400. The environment prediction system 130 can perform a Bayesian update to generate a posterior belief of the state of the environment 400, and include this posterior belief in the environment prediction. In some implementations, the raw sensor data also has a probability distribution for each object detected by the sensor subsystem of the on-board system 110 describing a confidence that the object is in the environment 400 at the corresponding location; in some other implementations, the raw sensor data includes detected objects with no corresponding probability distribution.

For example, if the global surfel map includes a representation of a particular object (e.g., the sign 430), and the raw sensor data includes a strong detection of the particular object in the same location in the environment 400, then the environment prediction can include a prediction that the object is in the location with high probability, e.g. 0.95 or 0.99. If the global surfel map does not include the particular object (e.g., the pedestrian 402), but the raw sensor data includes a strong detection of the particular object in the environment 400, then the environment prediction might include a prediction with moderate uncertainty that the object is in the location indicated by the raw sensor data, e.g. predict that the object is at the location with probability of 0.8 or 0.7. If the global surfel map does include the particular object, but the raw sensor data does not include a detection of the object at the corresponding location, or includes only a weak detection of the object, then the environment prediction might include a prediction that has high uncertainty, e.g. assigning a 0.6 or 0.5 probability that the object is present.

That is, the environment prediction system 130 shown in FIG. 1 might assign the same or more confidence to the correctness of the sensor data than to the correctness of the global surfel map. This might be true for objects that are determined to be temporary, e.g., pedestrians, animals, vehicles, or the like. Additionally or alternatively, the environment prediction system 130 shown might assign more confidence to the correctness of the global surfel map than to the correctness of the raw sensor data. This might be true for objects that are determined to be permanent, e.g., roads, road markers, barriers, trees, road signs, sidewalks, or the like. In either case, the environment prediction system 130 does not treat the raw sensor data or the global surfel map as a ground-truth, but rather associates uncertainty with both in order to combine them. Approaching each input in a probabilistic manner can generate a more accurate environment prediction, as the raw sensor data might have errors, e.g. if the sensors in the sensor subsystems of the on-board system 110 are miscalibrated, and the global surfel map might have errors, e.g. if the state of the environment 400 has changed.

In some implementations, the environment prediction can also include a prediction for each class of semantic information for each object in the environment. For example, the environment prediction system 130 shown in FIG. 1 can use a Bayesian model to update the associated data of each surfel in the global surfel map using the raw sensor data in order to generate a prediction for each semantic class and for each object in the environment 400. For each particular object represented in the global surfel map, the environment prediction system 130 can use the existing labels of semantic information of the surfels corresponding to the particular object as a prior distribution for the true labels for the particular object. For example, as will be described in more detail with respect to FIG. 5C, the on-board system 110 can assign a high confidence to surfels in the global surfel map that are already labeled as corresponding to the barrier 408 if the raw sensor data indicates that the barrier 408 is still present. The environment prediction system 130 can then update each prior using the raw sensor data to generate posterior labels and associated probabilities for each class of semantic information for the particular object. In some such implementations, the raw sensor data also has a probability distribution of labels for each semantic class for each object detected by the sensor subsystem of the on-board system 110; in some other implementations, the raw sensor data has a single label for each semantic class for each detected object.

As an example, where a particular surfel of the global surfel map characterizes the sign 430 with probability 0.8 and the sidewalk 420 with probability 0.2, if the sensor subsystems of the on-board system 110 detect the sign 430 at the same location in the environment 400 with high probability, then the Bayesian update performed by the environment prediction system 130 shown in FIG. 1 might generate new labels indicating that the object is the sign 430 with probability 0.85 and the sidewalk 420 with probability 0.15. The new labels and associated probabilities for the object are added to the environment prediction.

With respect to FIG. 1, the environment prediction system 130 can provide the environment prediction to the planning subsystem 150, which can use the environment prediction to make autonomous driving decisions for the vehicle 102, e.g., generating a planned trajectory for the vehicle 102 through the environment 400.

FIG. 5A is a diagram illustrating an example environment map of at least a portion of the environment of FIG. 4. Specifically, FIG. 5A illustrates the global surfel map 145 of the environment 400. As shown, the global surfel map 145 can include a multitude of surfels the represent various objects in the environment 400. The objects that the surfels represent may be those objects that are determined to have a sufficient level of permanence. For example, the global surfel map 145 may not include any surfels that represent animate objects such as persons and animals.

An environment map may be a representation of a real-world environment. The environment map may be a three-dimensional representation of a real-world environment. The environment map may be a surfel map such as the global surfel map 145. In some cases, the environment map is not a surfel map. For example, the environment map may be a polygon model.

With respect to FIG. 4, the global surfel map 145 may be stored on the on-board system 110 or may be accessed by the on-board system 110. The global surfel map 145 may have been generated prior to the vehicle 102 entering the environment 400. For example, the global surfel map 145 can be generated offline (e.g., by a server system) using collected sensor data, such as sensor data collected by one or more autonomous vehicles.

Each surfel in the global surfel map 145 is represented by a disk, and defined by three coordinates (latitude, longitude, and altitude), that identify a position of the surfel in a common coordinate system of the environment 400 and by a normal vector that identifies an orientation of the surfel. For example, each volume element (voxel) can be defined to be the disk that extends some radius, e.g. 1, 10, 25, or 100 centimeters, around the coordinate (latitude, longitude, and altitude). In some other implementations, the surfels can be represented as other two-dimensional shapes, e.g. ellipsoids, squares, rectangles, etc.

Each surfel in the global surfel map 145 has associated data characterizing semantic information for the surfel. For example, as discussed above with respect to FIG. 1, for each of multiple classes of semantic information, the global surfel map 145 can have one or more labels characterizing a prediction for the surfel corresponding to the class, where each label has a corresponding probability. As a particular example, each surfel can have multiple labels, with associated probabilities, predicting the type of the object characterized by the surfel. As another particular example, each surfel can have multiple labels, with associated probabilities, predicting the permanence of the object characterized by the surfel; for example, a "permanent" label might have a high associated probability for surfels characterizing buildings, while the "temporary" label might have a low probability for surfels characterizing vegetation. Other classes of semantic information can include a color, reflectivity, or opacity of the object characterized by the surfel.

As illustrated, a surfel classification key 502a indicates different surfel classifications and corresponding color/fill patterns for representations of surfels (e.g., in the global surfel map 145). A first classification of surfels corresponds to representations of signs or other metal object. Surfels that are associated with the first classification are depicted in the global surfel map 145 having the darkest color/the densest fill pattern. For example, surfels corresponding to the sign 430 and the flag pole 426 in the environment 400 are associated with the first classification. That is, the surfels corresponding to the sign 430 and the flag pole 426 have been classified (e.g., by the surfel map updating system 170 shown in FIG. 1) as representing a sign object and/or a metal object.

A second classification of surfels corresponds to representations of roadways. Surfels that are associated with the second classification are depicted in the global surfel map 145 having the second darkest color/the second densest fill pattern. For example, surfels corresponding to the road 404 in the environment 400 are associated with the second classification. That is, the surfels corresponding to the road 404 have been classified (e.g., by the surfel map updating system 170 shown in FIG. 1) as representing a roadway. The second classification may be more specific in that it might be reserved for surfels representing a roadway that the vehicle 102 is currently traveling on.

A third classification of surfels corresponds to representations of vegetation (e.g., grass, bushes, trees, etc.). Surfels that are associated with the third classification are depicted in the global surfel map 145 having the third darkest color/the third densest fill pattern. For example, surfels corresponding to the tree 422 and the bushes 424 in the environment 400 are associated with the third classification. That is, the surfels corresponding to the tree 422 and the bushes 424 have been classified (e.g., by the surfel map updating system 170 shown in FIG. 1) as representing some type of vegetation. The third classification can be, in some cases, broken down into multiple classifications or sub-classifications that correspond to different types of vegetation. For example, there can be a first subclass for surfels representing grass, a second subclass for surfels representing a bush, and a third subclass for surfels representing a tree.

A fourth classification of surfels corresponds to representations of textiles (e.g., cloth, clothing, flags, etc.). Surfels that are associated with the fourth classification are depicted in the global surfel map 145 having the fourth darkest color/the fourth densest fill pattern. For example, surfels corresponding to the flag 428 in the environment 400 are associated with the fourth classification. That is, the surfels corresponding to the flag 428 have been classified (e.g., by the surfel map updating system 170 shown in FIG. 1) as representing some type of textile. The fourth classification can be, in some cases, broken down into multiple classifications or sub-classifications that correspond to different types of textiles.

A fifth classification of surfels corresponds to representations of sidewalks and/or objects made from concrete (e.g., road barriers, walkways, etc.). Surfels that are associated with the fifth classification are depicted in the global surfel map 145 having the lightest color/the least dense fill pattern. For example, surfels corresponding to the sidewalk 420 in the environment 400 are associated with the fifth classification. That is, the surfels corresponding to the sidewalk 420 have been classified (e.g., by the surfel map updating system 170 shown in FIG. 1) as representing a sidewalk object and/or a concrete object. The fifth classification can be, in some cases, broken down into multiple classifications or sub-classifications that correspond to different types of concrete objects. For example, there may be a first subclass for sidwalks (and other walkways) and a second subclass for road barriers.

The classifications depicted in the example surfel classification key 502a are not necessarily comprehensive. There may more or less classifications that surfels in the global surfel map 145 can be associated with. As an example, there may be classification for road barriers, a classifications for road lines, different classifications for different types of vegetation (e.g., bush classification, tree classification, grass classification, etc.), etc. In some cases, a surfel may be associated with multiple classifications in the surfel classification key 502a. For example, a grouping of surfels that correspond to the road line 406 may be classified as both a roadway and a road line.

In some cases, the classifications depicted in the example surfel classification key 502a are a particular type of classification where each surfel in the global surfel map 145 is associated with only one these classifications. This type of classification may be used particularly for generating a filtered surfel map, and/or for selecting objects to be used during sensor calibration.

In some cases, the depiction of each surfel in the global surfel map 145 corresponds to the classification with the highest level confidence for each surfel. For example, a first surfel of the global surfel map 145 may be classified as belonging to the fifth classification (e.g., sidewalk/concrete classification) with a confidence of 0.72, and to the third classification (e.g., grass/bush/tree classification) with a confidence of 0.28. Accordingly, the depiction of the surfel may correspond to the fifth classification due to it being associated with the higher confidence. Similarly, with respect to FIG. 1, the environment prediction system 130, in generating the filtered surfel map 132, may simplify global surfel map 145 such that each surfel is associated with a single classification (e.g., the classification with the highest confidence; or the classification of the classifications in the surfel classification key 502a with the highest confidence such that other classifications not in the surfel classification key 502a are ignored and/or otherwise left alone). This may be helpful to reduce the processing burden of the environment prediction system 130 when generating the filtered surfel map 132, which could help to decrease the time it takes for the environment prediction system 130 to generate the filtered surfel map 132 and/or to free up processing power that can be used for other tasks such as object detection during autonomous navigation.

The definitions of semantic labels, such as the labels "permanent" and/or "temporary" or the classifications in the surfel classification key 502a, can each have one or more definitions. The definition applied may be dependent on context. These definitions may be set by, for example, a system administrator. As a particular example, the label "permanent" may not necessarily have a single standard of longevity. In some cases, an additional or alternative label may be attached to objects that are critical to navigation and/or are reliable (e.g., have positions that are unlikely to change in the immediate future) but that are known to be moved at some point in the future. For example, the label "semi-permanent" may be attached to a representation of the sign 430 in place of "permanent" to indicate that the sign 430 will likely be moved at some point in the future.

Figure 5B:
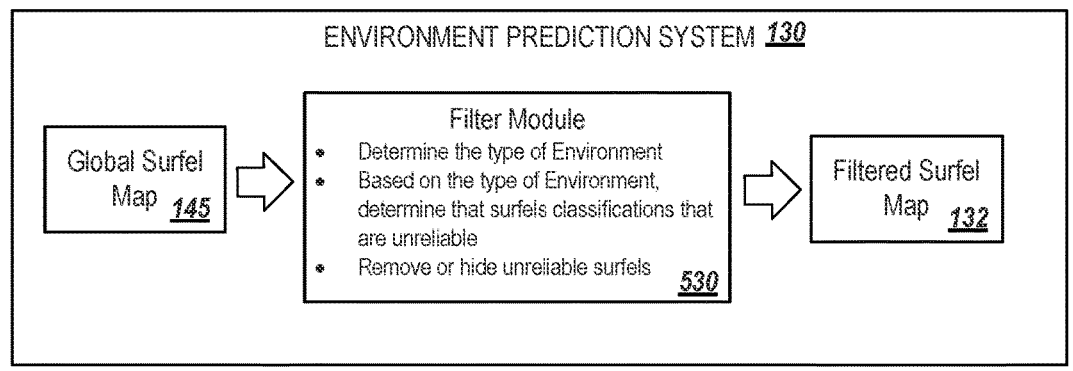
FIG. 5B is a diagram illustrating an example process of filtering an environment map.
Figure 5B:
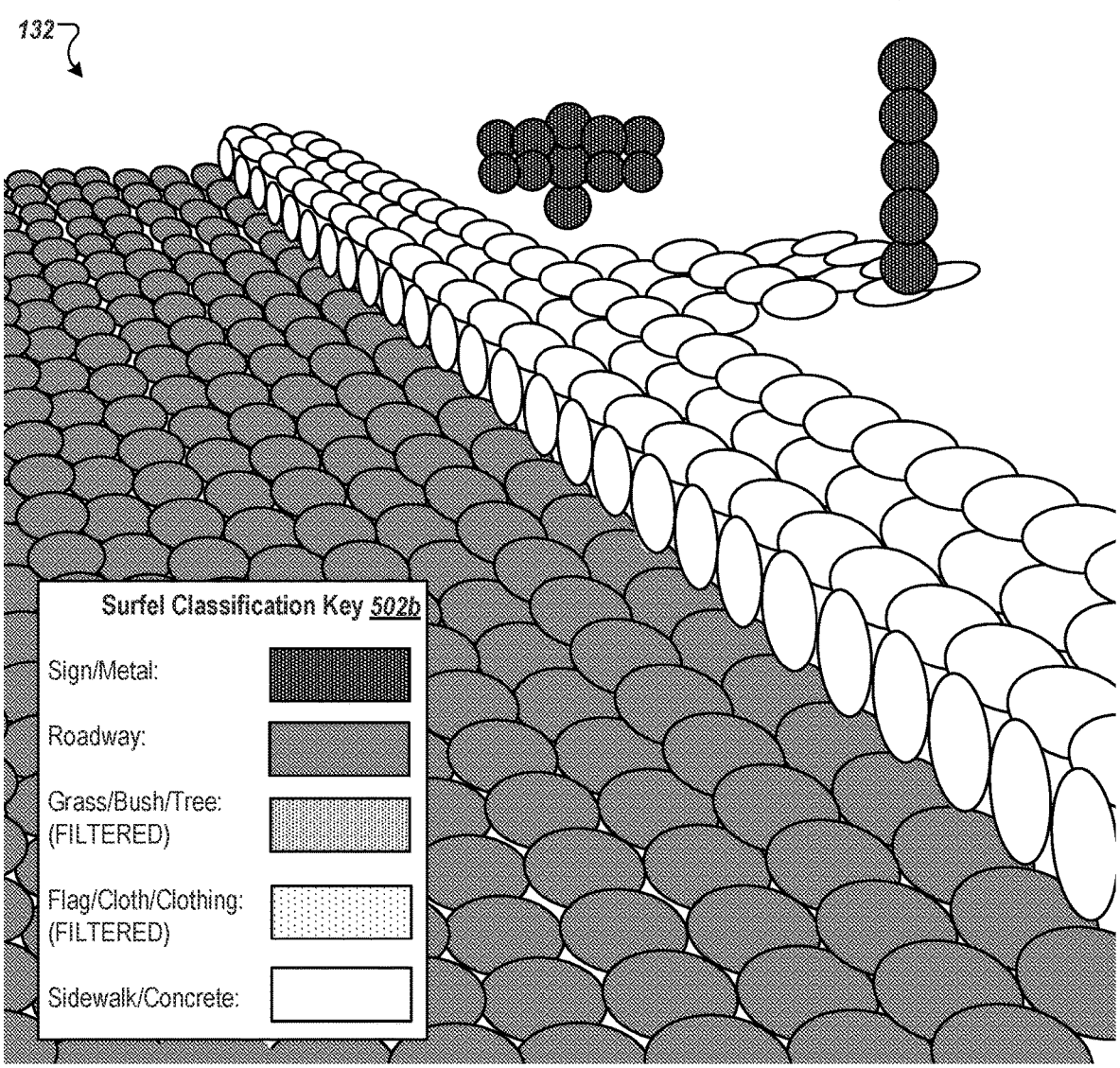

FIG. 5B is a diagram illustrating an example process of filtering the global surfel map 145. In filtering the global surfel map 145, the environment prediction system 130 of the on-board system 110 shown in FIG. 1 can remove one or more surfels from the global surfel map 145, or temporarily hide one or more surfels from the global surfel map 145. The one or more surfels that are hidden or removed may be surfels associated with a particular classification. Additionally or alternatively, the one or more surfels that are hidden or removed may be surfels associated with a confidence below a threshold level of confidence (e.g., surfels with more than an acceptable level of uncertainty are removed or hidden from the global surfel map 145).

In filtering the global surfel map 145, the environment prediction system 130 may provide the global surfel map 145 to a filter module 530. The filter module 530 may determine a type of environment that the vehicle 102 is located. That is, the filter module 530 may identify a type of environment corresponding to the environment 400. The type of environment indicate, for example, one or more of a type of roadway that the vehicle 102 is traveling on (e.g., one-way street, two-lane road, four-lane highway, bridge, etc.) and/or the surrounding area (e.g., forested, urban, suburban, etc.). As an example, the filter module 530 may determine that the environment 400 is a four-lane road in a suburban area. In some cases, the type of environment may additionally or alternatively indicate other information such as current conditions of the environment (e.g., weather conditions, construction zones, closed lanes, etc.).

The filter module 530 may make this determination by analyzing the global surfel map 145. For example, if the percent of surfels associated with the second classification (e.g., roadway) is greater than 60% of the total surfels representing the environment and the percent of surfels associated with the third classification (e.g., grass/bush/tree) is between 5% and 30% of the total surfels representing the environment, then the filter module 530 may determine that the environment is a highway. Similarly, if the percent of surfels associated with the third classification (e.g., grass/bush/tree) is greater than 55%, then the filter module 530 may determine that the environment is a forested area. As another example, if the surfels associated with the second classification (e.g., roadway) indicates a road width is between 18.5 feet and 28 feet, the filter module 530 may determine that the environment is a two-lane road.

In some cases, the filter module 530 can determine multiple types of environments for a particular environment. For example, the filter module 530 may analyze a global surfel map to determine that the vehicle 102 is currently traveling down a two-lane road based on the global surfel map indicating that the width of the road is twenty-five feet, and that the vehicle 102 is traveling in a forested area based on 62% of the surfels in the environment being associated with the third classification (e.g., grass/bush/tree).

An administrator may define the different types of environments. Additionally or alternatively, an administrator may label different geographic areas (e.g., in the global surfel map 145 or another map that can be compared to the global surfel map 145) as being of a particular type of environment. The filter module 530 may compare the location of the vehicle 102 to these geographic areas to identify the geographic area that the vehicle 102 is located in (or is about to enter), and lookup a corresponding type of environment. For example, the filter module 530 may obtain data from a GPS unit of the on-board system 110 and use the data to determine a location for vehicle 102. The filter module 530 may use the location for the vehicle 102 to determine that the vehicle 410 is in the environment 400. The filter module 530 may proceed to lookup one or more environment type labels associated with the environment 400. For example, the filter module 530 may access a label indicating that the environment 400 is four-lane road.

Alternatively, the on-board system 110 or the server system 122 shown in FIG. 1 may use one or more machine learning networks to define the different types of environments (e.g., to generate surfel classification percent ranges to associate with different types of environments), In some cases, one or more machine learning networks are used to determine the type of environment. For example, the filter module 530 may provide the global surfel map 145 or a portion of the global surfel map 145 that corresponds to the environment 400 as input to one or more machine learning networks. The one or more machine learning networks may output at least one value that corresponds to one or more types of environments. For example, the one or more machine learning networks may output a value of 0.65 The one or more machine learning networks may be trained with surfel maps or portions of surfel maps that have already been associated with one or more types of environments (e.g., where an administrator has indicated the type of environment(s) in the surfel map or the portions of the surfel map).

In some cases, determining the type of environment is based on other information such as sensor data collected by the vehicle 102. For example, the current speed of the vehicle, the average speed of the vehicle 102 over an amount of time (e.g., one minute, two minutes, five minutes, etc.) or a particular distance (e.g., last 0.5 miles, 1.0 miles, 2 miles, etc. of travel distance), or the highest speed of the vehicle over an amount of time (e.g., one minute, two minutes, five minutes, etc.) or a particular distance (e.g., last 0.5 miles, 1.0 miles, 2 miles, etc. of travel distance) may be used by the filter module 530 to determine the type of environment. Specifically, if the average speed of the vehicle 102 over the last two minutes if 63 mph, then the filter module 530 may use the average speed in determining the environment that vehicle 102 is traveling in is a highway.

In some cases, the type of environment may indicate particular conditions in the environment 400. For example, the type of environment may indicate weather conditions that vehicle 102 is experiencing in the environment 400, such as rain, snow, sleet, hail, etc.

After determining the type of environment corresponding to the environment 400, the filter module 530 may determine one or more surfel classifications that are unreliable based on the type of environment. As an example, based on the environment 400 being a four-lane roadway in a suburban area, the filter module 530 may determine that surfels corresponding to the third classification (e.g., grass/bush/tree) and the fourth classification (e.g., flag/cloth/clothing) should be removed or hidden from the global surfel map 145. In making this determination, the environment 400 may refer to a lookup table that indicates that classifications of surfels that should be removed for different types of environments and/or combinations of different types of environment. As an example, a lookup table may indicate that surfels corresponding to third classification should not be filtered when the environment is a heavily forested area (e.g., to account for the lack of non-vegetation landmarks in heavily forested areas).

In some cases, the filter module 530 provides the type(s) of environment(s) as input to one or more machine learning networks. The output of the one or more machine learning networks may include a value that is indicative of one or more surfel classifications that should be filtered. The one or more machine learning networks may be initially trained using, for example, a pre-defined lookup table. The one or more machine learning networks may trained or retrained using one or more feedback loops with the goal of reducing navigation errors, localization errors, and/or calibration errors (e.g., that arise after using the filtered surfel map 132).

Some surfel classifications may be generally unreliable due to them being associated with objects that are not permanent, tend to change position over time, and/or tend to change appearance over time. For example, surfels belonging to the third classification (e.g., grass/bush/tree) may generally be considered unreliable for tending to change position and/or appearance over time due to growth of the vegetation, trimming of the vegetation, death of the vegetation, relocation of the vegetation, etc. Similarly, surfels belonging to the fourth classification (e.g., flag/cloth/clothing) may generally be considered unreliable for tending to change appearance and/or position due to, for example, wind or other weather conditions. However, in some cases, the filter module 530 may refrain from filtering surfels corresponding to these classifications if it would mean, for example, filtering out too much of global surfel map 145 (e.g., more than 30%, 45%, 60%, etc. of the global surfel map 145's surfels), would likely result in filtering out too much of the global surfel map 145 (e.g., as indicative by the type of environment), would likely result in an insufficient number of landmarks to use for navigation, localization, and/or calibration (e.g., as indicative by the type of environment), etc.

After determining the surfel classifications that should be filtered from the global surfel map 145, the filter module 530 may proceed to generate the filtered surfel map 132 by removing or hiding surfels that are considered unreliable. That is, the filter module 530 may proceed to remove or hid surfels in the global surfel map 145 that are associated with the determined unreliable surfel classifications. As shown, the filtered surfel map 132 does not include or does not depict surfels belonging to the third classification (e.g., grass/bush/tree) and surfels belonging to the fourth classification (e.g., flag/cloth/clothing). Notably, a grouping of surfels that represented the flag 428 has been removed or hidden due to being associated with the fourth classification. The surfel classification key 502b has also been updated to reflect the particular surfel classifications that have been filtered.

In some cases, the filter module 530 may refrain from removing or hiding any surfels based on the determined type of environment. For example, if the type of environment is a heavily forested area (e.g., without much of any landmarks other than trees or other vegetation), then the filter module 530 may determine that no surfels should be filtered from the global surfel map 145. Accordingly, the filter module 530 may output an indication to the environment prediction system 130 that the on-board system 110 should use the existing global surfel map 145 in the environment 400, e.g., for navigation, localization, and/or calibration.

In some cases, as described above, instead of filtering surfels based on the type of environment, the filter module 530 may filter (e.g., remove or hide) surfels associated with an uncertainty (e.g., classification uncertainty/confidence) that is below a threshold uncertainty level.

In some cases, instead of filtering surfels, the filter module 530 identifies reliable and/or unreliable surfels. For example, the filter module 530 may, using the techniques described above, identify a subset of surfels in the global surfel map 145 that are sufficiently reliable to use for calibration. Specifically, the filter module 530 may identify all surfels associated with the first surfel classification (e.g., sign/metal) as being sufficiently reliable to use to calibrate one or more on-board sensors of the vehicle 102's on-board system 110. The filter module 530 may optionally tag the surfels in the subset of surfels to indicate that they are sufficiently reliable to use for calibration. A calibration module 532, described below with respect to FIGS. 5C-5D, may identify the subset of surfels using the tags and proceed to use only those surfels for sensor calibration.

Reliability may also be based on the observed consistency in the location of particular objects (e.g., in addition to the reliability associated with particular types of object) in a real-world environment. For example, the number of times that autonomous or semi-autonomous vehicles have confirmed that the location of the sign 430 in the environment 400, and/or how recently the autonomous or semi-autonomous vehicles have confirmed that the location of the sign 430 in the environment 400 may be used by the on-board system 110 in determining a reliability for the grouping of surfels in the global surfel map 145 that represent the sign 430 and/or may serve as a factor in determining a reliability to associate with surfels that belong to the first surfel classification (e.g., sign/metal).

Figure 5C:
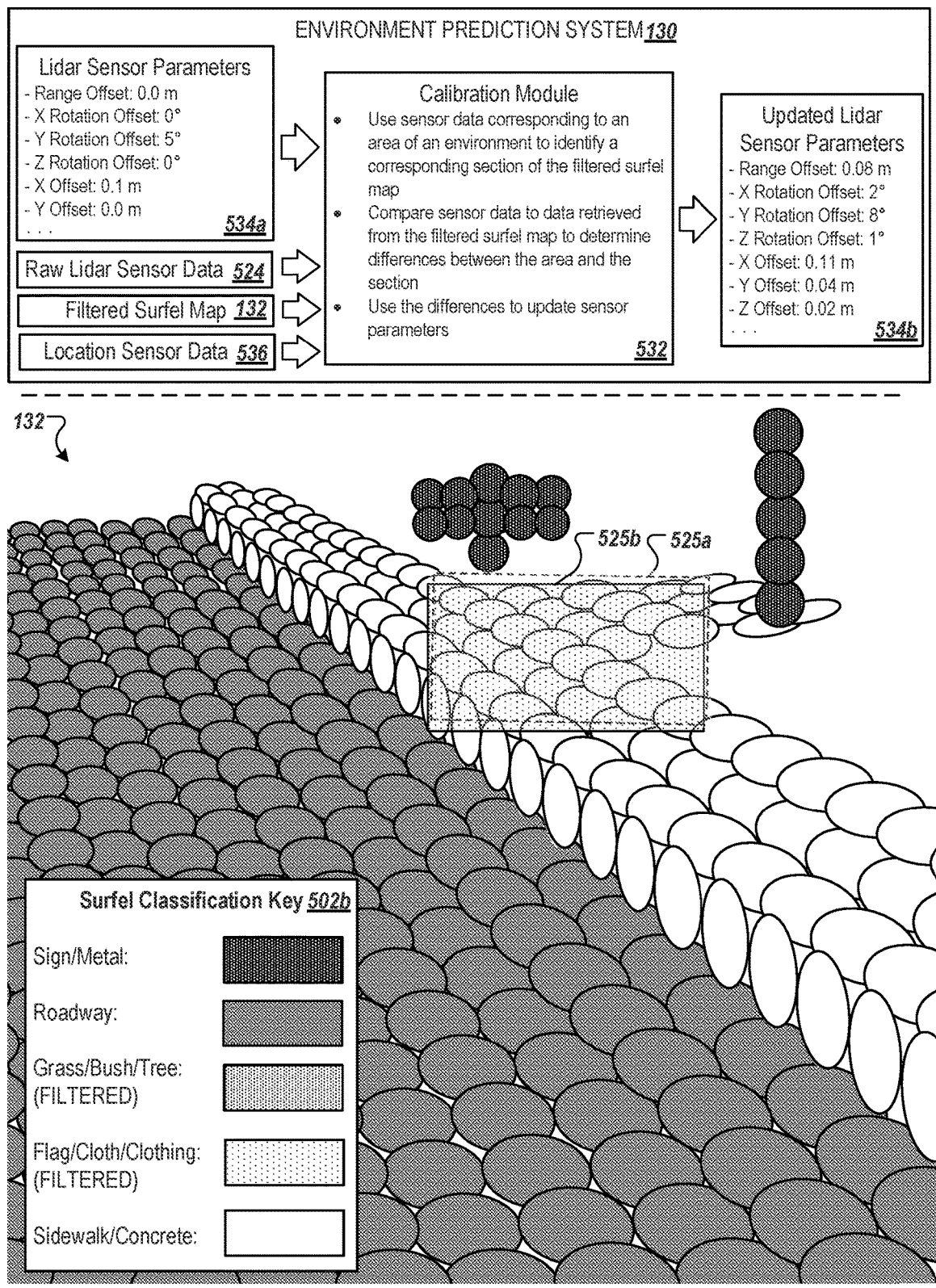
FIG. 5C is a diagram illustrating an example calibration procedure to update lidar sensor parameters using a filtered environment map.

FIG. 5C is a diagram illustrating an example calibration procedure to update lidar sensor parameters using a filtered environment map. Specifically, FIG. 5C is a diagram illustrating an example calibration procedure to update lidar sensor parameters using the filtered surfel map 132. The lidar sensor may be part of the on-board system 110. Specifically, the lidar sensor may be part of the sensor subsystems 120 shown in FIG. 1. The calibration procedure may include performing lidar dense calibration by matching points from lidar data to corresponding surfels in in the filtered surfel map 132.

As illustrated a calibration module 532 of the environment prediction system 130 may receive lidar sensor parameters 534a, raw lidar sensor data 524, the filtered surfel map 132, and location sensor data 536 as input. In some cases, the calibration module 532 also receives image data corresponding to the raw lidar sensor data 524 (e.g., images that are synchronized to the raw lidar sensor data 524) as input. The lidar sensor parameters 534a may include, for example, a range offset corresponding to the range of laser points, an x-axis rotation offset corresponding to a roll angle offset (e.g., with respect to a position of one or more cameras of the on-board system 110), a y-axis rotation offset corresponding to a pitch angle offset (e.g., with respect to a position of one or more cameras of the on-board system 110), a z-axis rotation offset corresponding to a yaw angle offset (e.g., with respect to a position of one or more cameras of the on-board system 110), an x-axis offset corresponding to a position offset along a first axis (e.g., with respect to a position of one or more cameras of the on-board system 110), a y-axis offset corresponding to a position offset along a second axis (e.g., with respect to a position of one or more cameras of the on-board system 110), and a z-axis offset corresponding to a position offset along a third axis (e.g., with respect to a position of one or more cameras of the on-board system 110). The lidar sensor parameters 534a may include one or more additional parameters. For example, as described in more detail below, the lidar sensor parameters 534a may include characteristics and/or current settings of the lidar sensor.

The raw lidar sensor data 524 may include laser data such as point data that can be used by the calibration module 532 to generate a point cloud for the environment 400 or a portion of the environment 400. The raw lidar sensor data 524 may be generated by the lidar sensor. In some cases, the environment prediction system 130 sends instructions to the lidar sensor (e.g., to the sensor subsystems 120) to collect raw lidar sensor data 524 after the filtered surfel map 132 is generated (e.g., in response to generating the filtered surfel map 132).

The location sensor data 536 may be obtained using one or more sensors of the on-board system 110. For example, the location sensor data 536 may include GPS coordinates obtained using a GPS unit of the sensor subsystems 120. Additionally or alternatively, the location sensor data 536 may include accelerometer data and/or inertial measurement unit (IMU) data that can be used estimate a location of the vehicle 102 in the environment 400. The location sensor data 536 may be synchronized with the raw lidar sensor data 524 such that, for example, the location sensor data 536 indicates the location(s) of the vehicle 102 in the environment 400 at a time when the raw lidar sensor data 524 was collected, or times when different portions of the raw lidar sensor data 524 was collected. The location sensor data 536 may be modified to account for differences in position of the lidar sensor with respect to a GPS unit used to generate the location sensor data 536.

The calibration module 532 may use sensor data corresponding to an area of an environment to identify a corresponding section of the filtered surfel map 132. For example, the calibration module 532 can use the raw lidar sensor data 524 (or a portion of the raw lidar sensor data 524) and/or the location sensor data 536 to identify a corresponding portion of the filtered surfel map 132. Specifically, the calibration module 532 may select a subset of points in the raw lidar sensor data 524, identify angles and/or ranges corresponding to those points (e.g., a position of the lidar sensor and/or a position of the vehicle 102 when the points were obtained), and use the location of the vehicle 102 and the identified angles and/or ranges to identify an section 525a in the filtered surfel map 132 corresponding to the subset of points. The subset of points may be those that were obtained by the lidar sensor at a particular point in time, and/or while the lidar sensor was in a particular position.

Additionally or alternatively, the calibration module 532 can use the raw lidar sensor data 524 (or a portion of the raw lidar sensor data 524) with corresponding image data to identify the section 525a. Specifically, the calibration module 532 may identify an image and a subset of points corresponding to the image, e.g., points that fall within the bounds of the image (e.g., where the bounds of the image corresponds to the section 525a) and/or that were obtained at the same time as when the image was taken. The calibration module 532 may proceed to determine a position of a camera synchronized to the lidar sensor and used to take the image. The calibration module 532 can use the camera position with the location of the vehicle 102 to identify the section 525a corresponding to the subset of points corresponding to the image.

After identifying the section 525a, the calibration module 532 may compare sensor data to data retrieved from the filtered surfel map 132 to determine differences between the area and the section. Comparing the sensor data to data retrieved from the filtered surfel map 132 may include identifying point matches between the raw lidar sensor data 524 and the filtered surfel map 132. For example, the calibration module 532 may match the point cloud data from the raw lidar sensor data 524 to distances of surfels in the filtered surfel map 132 to identify a section of the filtered surfel map 132 that matches the ranges in the point cloud data. The calibration module 532 may calculated distances by identifying a surfel in the filtered surfel map 132 corresponding to a given point (e.g., a surfel that represents an area in the environment 400 that the corresponding laser point would contact), accessing a location corresponding to the surfel (e.g., three-dimensional coordinates), and calculating a distance from surfel location to the vehicle location or location of the lidar sensor (e.g., location indicated by the location sensor data 536).

After matching or substantially matching a sufficient number of points in the point cloud (e.g., a threshold number of points, a threshold percent of points, a threshold number or percent of points from a subset of points sampled from the point cloud, all of the points in the point cloud, or all of the points in a subset of points sampled from the point cloud), the calibration module 532 may identify a section 525*b* that represents a section of the filtered surfel map 132 that the raw lidar sensor data 524 matches or substantially matches. That is, the section 525*b* may represent an area of the environment 400 that accurately corresponds to the raw lidar sensor data 524 or, at least, more accurately corresponds to the raw lidar sensor data 524 than an area of the environment 400 corresponding to the section 525*a*.

The calibration module 532 may compare the section 525*a* to the section 525*b* to identify differences between the section 525*a* and the section 525*b*. These differences may include differences in location, size, shape, etc. These differences may represent the differences between the expected locations point data with respect to the filtered surfel map 132 and the actual locations of the point data with respect to the filtered surfel map 132. The calibration module 532 may use these differences to generate the updated lidar sensor parameters 534*b*.

Comparing the sensor data to data retrieved from the filtered surfel map 132 may alternatively or additionally include comparing the sensor data to data retrieved from the section of the filtered surfel map 132 to identify differences between the sensor data and the data retrieved. For example, the calibration module 532 may compare ranges of points in a point cloud corresponding to the section 525*a* (e.g., from the raw lidar sensor data 524) to corresponding expected ranges based on the locations of surfels in the filtered surfel map 132. In some cases, the calibration module 532 may randomly sample points in the point cloud corresponding to the section 525*a* to obtain a subset of points and use this subset of points for the comparison. That is, the calibration module 532 may identify a range for each point in the subset of points, identify an expected range for each point in the subset of points using locations of surfels in the filtered surfel map 132, and proceed to compare the ranges to the expected ranges. Identifying an expected range for a point in the point cloud corresponding to the section 525*a* may include identifying a surfel in the filtered surfel map 132 corresponding to the point (e.g., the surfel represents an area in the environment 400 that the laser point would contact), accessing a location corresponding to the surfel, and calculating a distance from surfel location to the vehicle location (e.g., location indicated by the location sensor data 536).

The calibration module 532 may proceed to use these differences in addition to or in place of the points matches described above to generate the updated lidar sensor parameters 534*b*. For example, the calibration module 532 may increase the range offset from 0.0 m to 0.08 m, the x-axis rotation offset to 2°, the y-axis rotation offset to 8°, the z-axis rotation offset to 1°, the x-axis offset to 0.11 m, the y-axis offset to 0.04 m, and the z-axis offset to 0.02 m. The effect that the updated lidar sensor parameters 534*b* have can be depicted by the corrected section 525*b*, that more accurately represents the area in the environment 400 that the raw lidar sensor data 524 corresponds to.

In some cases, updating the lidar sensor parameters includes adjusting one or more lider sensor settings or characteristics. For example, the output of the calibration module 532 may indicate that the one or more of the point density (e.g., if adjustable), the field of view (e.g., if adjustable), and/or the laser repetition rate (e.g., if adjustable) of the lidar sensor should be modified to improve accuracy of the lidar sensor.

Figure 5D:
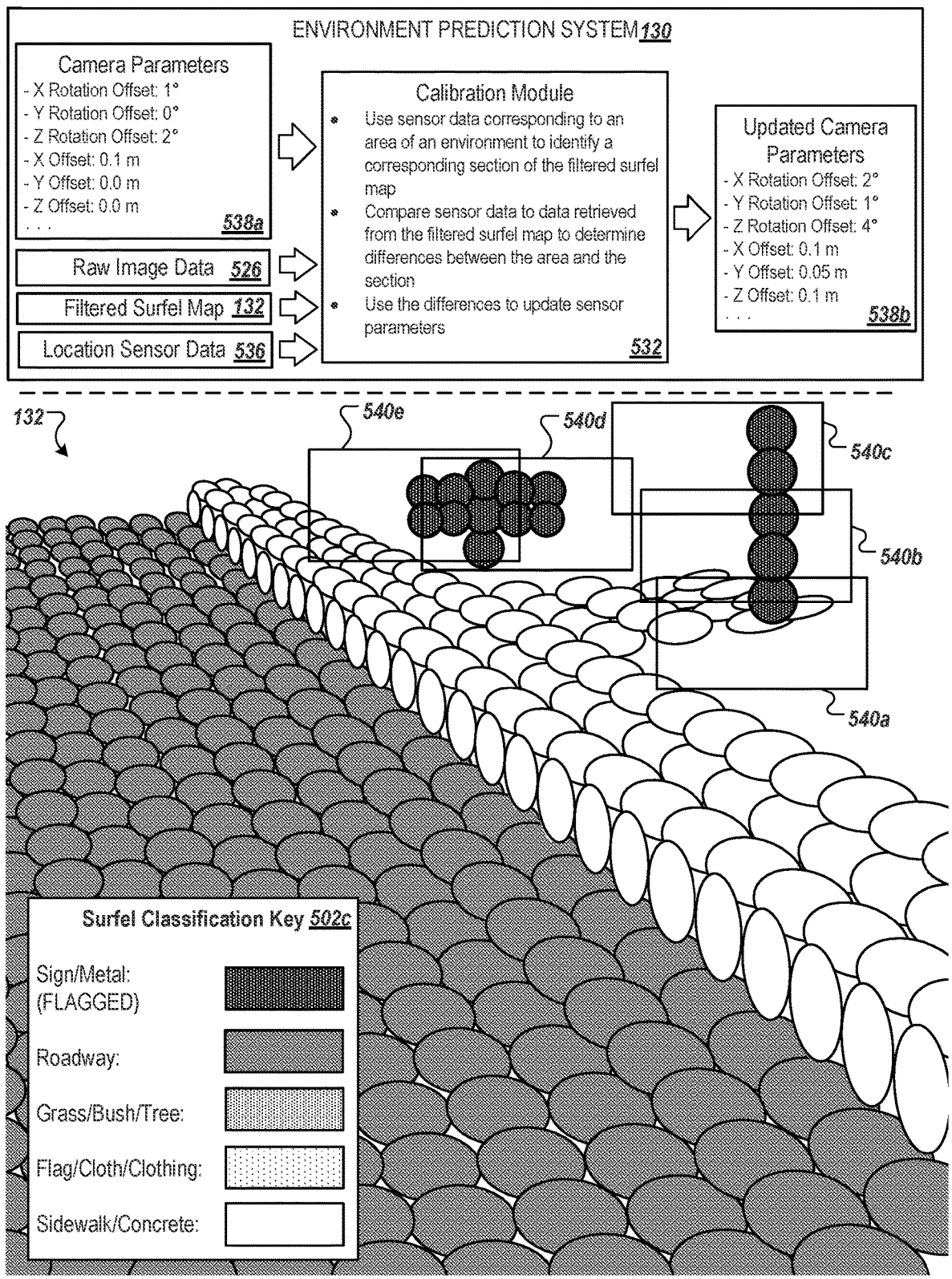
FIG. 5D is a diagram illustrating an example calibration procedure to update camera parameters using a filtered environment map.

FIG. 5D is a diagram illustrating an example calibration procedure to update camera parameters using a filtered environment map. Specifically, FIG. 5D is a diagram illustrating an example calibration procedure to update camera parameters using the filtered surfel map 132. The process of updating camera parameters may be used in addition to the process for updating the lidar sensor parameters described above in FIG. 5C, or in place of the process for updating the lidar sensor parameters. The calibration procedure may include performing camera feature matching between collected images and flagged features in the filtered surfel map 132.

As illustrated the calibration module 532 of the environment prediction system 130 may receive camera parameters 538*a*, raw image data 526, the filtered surfel map 132, and the location sensor data 536 as input. The camera parameters 538*a* may include, for example, an x-axis rotation offset corresponding to a roll angle offset (e.g., with respect to a mount of the camera; with respect to a position of a lidar sensor of the on-board system 110; etc.), a y-axis rotation offset corresponding to a pitch angle offset (e.g., with respect to a mount of the camera; with respect to a position of a lidar sensor of the on-board system 110; etc.), a z-axis rotation offset corresponding to a yaw angle offset (e.g., with respect to a mount of the camera; with respect to a position of a lidar sensor of the on-board system 110; etc.), an x-axis offset corresponding to a position offset along a first axis (e.g., with respect to a mount of the camera; with respect to a position of a lidar sensor of the on-board system 110; etc.), a y-axis offset corresponding to a position offset along a second axis (e.g., with respect to a mount of the camera; with respect to a position of a lidar sensor of the on-board system 110; etc.), and a z-axis offset corresponding to a position offset along a third axis (e.g., with respect to a mount of the camera; with respect to a position of a lidar sensor of the on-board system 110; etc.). The camera parameters 538*a* may include one or more additional parameters. For example, as described in more detail below, the camera parameters 538*a* may include characteristics and/or current settings of the camera.

The location sensor data 536 may be obtained using one or more sensors of the on-board system 110. For example, the location sensor data 536 may include GPS coordinates obtained using a GPS unit of the sensor subsystems 120. Additionally or alternatively, the location sensor data 536 may include accelerometer data and/or inertial measurement unit (IMU) data that can be used estimate a location of the vehicle 102 in the environment 400. The location sensor data 536 may be synchronized with the raw image data 526 such that, for example, the location sensor data 536 indicates the location(s) of the vehicle 102 in the environment 400 at a time when the raw image data 526 was collected, or times when different images in the raw image data 526 were collected. The location sensor data 536 may be modified to account for differences in position of the camera with respect to a GPS unit used to generate the location sensor data 536.

The raw image data 526 may include visible-light images, infrared-light images, time-of-flight camera images, or combinations different types of images. The raw image data 526 may captured by the camera. In some cases, the environment prediction system 130 sends instructions to the camera (e.g., to the sensor subsystems 120) to collect the raw image data 526 after the filtered surfel map 132 is generated (e.g., in response to generating the filtered surfel map 132). The instructions may include instructions for the camera to be moved to one or more positions to captures areas of the environment 400 that correspond to flagged features in the filtered surfel map 132. These flagged features may include specific surfels that have been flagged, specific groupings of surfels that have been flagged (e.g., for representing a specific object, or particular part(s) of an object such as the corners of an object that are easily identifiable), surfels that are associated with a particular surfel classification, etc. Features may be flagged by, for example, an administrator. Additionally or alternatively, features may be flagged using the output of one or more algorithms (e.g., one or more machine learning algorithms) that can indicate objects and/or features of objects that can easily be identified (e.g., due to large size, sharp angles, permanence/unlikely to move, large features, high contrast, etc.).

As an example, one or more classifier machine learning networks may be trained to recognize interest points on an object. For example, given a particular image (e.g., a keypoint image) the environment prediction system 130 may determine all or a large number of possible views of an object in the image. The one or more classifier machine learning networks may include a tree classifier that is trained to recognize keypoints in the image. For example, the tree classifier may assign one class per keypoint. Alternatively, the tree classifier may use a binary approach where it assigns each keypoint a one for yes (e.g., indicating a match) or a zero for no (e.g., indicating not a match).

As demonstrated in the updated surfel classification key 502c, the first surfel classification (e.g., sign/metal) may have been flagged for feature matching. This indicates that any surfels in the filtered surfel map 132 that are associated with the first surfel classification have been flagged for camera feature matching. In response to determining that this class of surfels have been flagged for camera feature matching, the environment prediction system 130 may generate and send instruction to the sensor subsystems 120 shown in FIG. 1 to position the camera towards the flagged features (e.g., using the expected locations for the flagged features based on the filtered surfel map 132) and capture corresponding images. For example, the camera may capture images that correspond to area of the environment 400 that are represented by the sections 540a-540e of the filtered surfel map 132. The calibration module 532 may provide the captured images of the raw image data 526 to one or more classifier machine learning networks to identify the keypoints in the images (e.g., the points corresponding to the flagged features). Here, the keypoints may include, for example, an outline/outer edge of the sign 430, and an outline/outer edge of the flag pole 426.

In some cases, the calibration module 532 converts the raw image data 526 to one or more vectors prior to comparison with the filtered surfel map 132. For example, the calibration module 532 may generate a vector for image patches in the raw image data 526 by taking an image and smoothing the image patch. The calibration module 532 may proceed to take pairs of points and for each pair determine if a first point in the pair is brighter than the other point. If yes, the calibration module 532 may assign a "1" to the first point. If no, the calibration module 532 may assign a "0" to the first point. The calibration module 532 may optionally bias the pairs towards the center. The calibration module 532 may do this repeatedly until the image patch is boiled down to a vector.

The calibration module 532 may use sensor data corresponding to an area of an environment to identify a corresponding section of the filtered surfel map 132. For example, as discussed above, the sections 540a-540e are sections of the filtered surfel map 132 that were expected to match or substantially match the areas of the environment 400 captured in the raw image data 526. The calibration module 532 may compare the keypoints identified from the raw image data 526 to corresponding keypoints in the filtered surfel map 132 to identify differences between the expected locations of the flagged features and the actual locations for the flagged features. For example, the calibration module 532 may compare vectors generated from raw image data 526 to corresponding portions in the filtered surfel map 132 to identify the distances between an expected keypoint location and an actual keypoint location for each of the keypoints. The calibration module 532 can use these differences to generate the updated camera parameters 538b.

In some cases, updating the camera parameters includes adjusting one or more camera settings or characteristics. For example, the output of the calibration module 532 may indicate that the one or more of the camera's aperture, shutter speed, ISO, radial distortion parameters for a lens of the camera, and/or a focal length of the camera (e.g., to improve accuracy of images captured using the camera).

Figure 6:
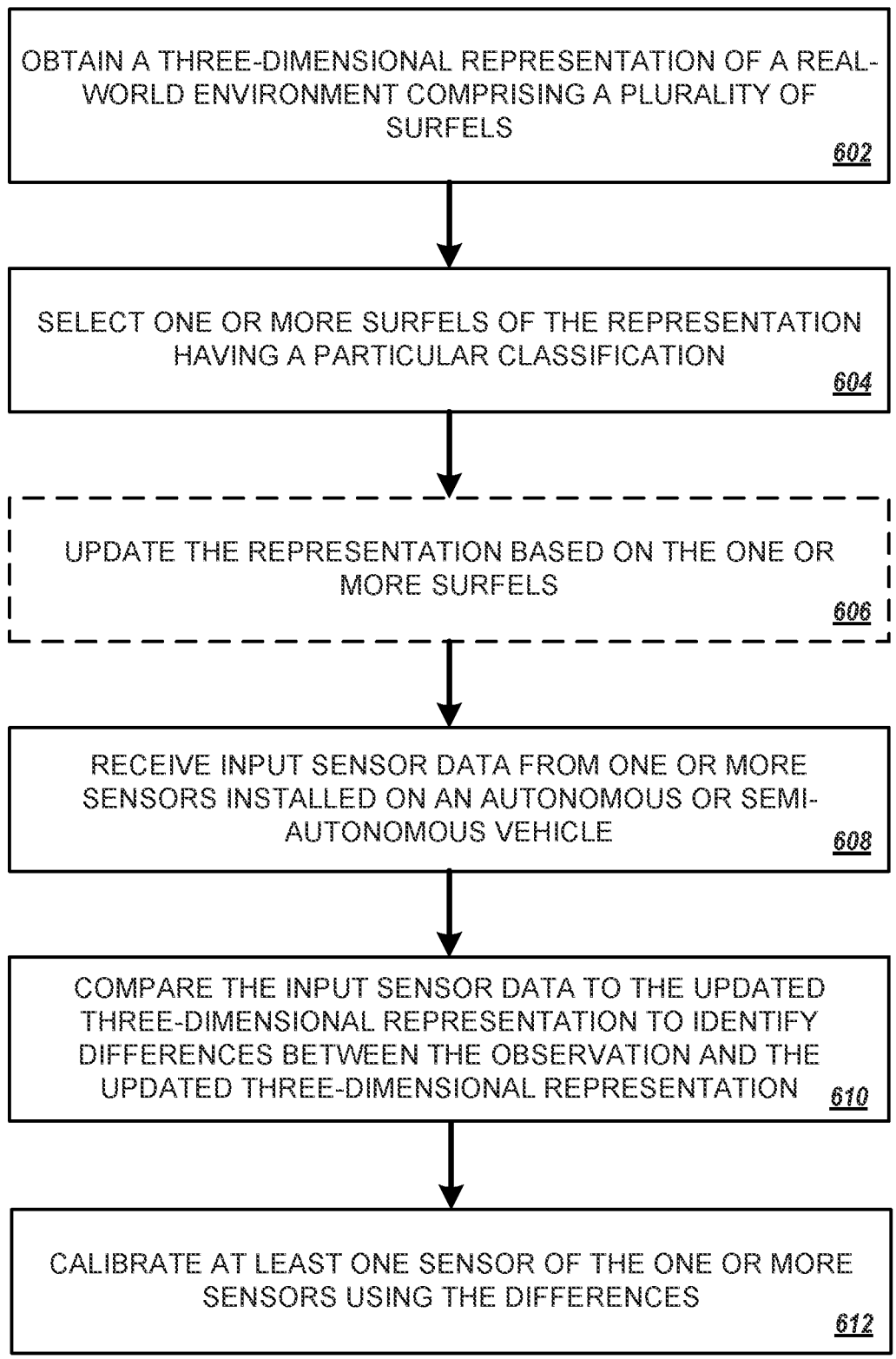
FIG. 6 is a flow diagram of an example process for using an environment map to calibrate one or more sensors of a system.

FIG. 6 is a flow diagram of an example process for using an environment map to calibrate one or more sensors of a system. The process can be performed, at least in part, using the on-board system 110 described herein with respect to FIG. 1. The example process will be described as being performed by a system of one or more computers.

The system obtains a three-dimensional representation of a real-world environment comprising a plurality of surfels (602). With respect to FIG. 4, the real-world environment can be the environment 400. The three-dimensional representation of the real-world environment can be a surfel map. For example, with respect to FIG. 1, the three-dimensional representation of the real-world environment can be the global surfel map 145 or another global surfel map for the environment 400. The global surfel map can be an existing surfel map that has been generated by combining sensor data captured by multiple vehicles navigating through the real-world environment. The portion of the global surfel map can correspond to the environment 400, e.g., previously generated by combining sensor data captured by one or more vehicles had navigated through the environment 400. As an example, this global surfel map can include an indication of the road 404, the sidewalk 420, the tree 422, the bushes 424, the flag pole 426, the flag 428, and the sign 430.

In some cases, each of the surfels of the plurality of surfels corresponds to a respective point of plurality of points in a three-dimensional space of the real-world environment. For example, with respect to FIG. 5A, each of the surfels of the plurality of surfels in the global surfel map 145 can have spatial coordinates, e.g., (x,y,z) defining a particular position of the respective surfel in a three-dimensional coordinate system of the environment 400 shown in FIG. 4. Additionally or alternatively, each of the surfels of the plurality of surfels in the global surfel map 145 can have orientation coordinates, e.g., (pitch, yaw, roll) defining a particular orientation of the surface of the respective surfel. As another example, with respect to FIG. 5A, each of the surfels of the plurality of surfels in the global surfel map 145 can have spatial coordinates that define the particular position of the respective surfel in a three-dimensional coordinate system (e.g., of the environment 400 shown in FIG. 4) and a normal vector, e.g. a vector with a magnitude of 1, that defines the orientation of the surface of the respective surfel at the particular position.

The global surfel map 145 depicts the environment 400 using multiple surfels. Each of the surfels can have one or more labels and corresponding confidences. The labels can, for example, identify the object that the surfel is conveying, identify a material that the object is made of, identify a permanence of the object, identify a color of the object (or a portion of the object), identify a opaqueness of the object (or a portion of the object), etc. With respect to FIG. 5A, the labels can correspond to particular surfel classifications which are depicted, for example, using different colors/fill densities.

Multiple surfels of the plurality of surfels can be associated with a plurality of different classifications. For example, each surfel in the global surfel map 145 may be associated with one of the five surfel classification shown in the surfel classifications key 502*a*.

The system selects one or more surfels of the representation having a particular classification (604). For example, the environment prediction system 130 (or the server system 122) may select all surfels in the global surfel map 145 that are associated with the third surfel classification (e.g., grass/bush/tree) and the fourth surfel classification (e.g., flag/cloth/clothing). The surfels and/or the classification of surfels selected may be based on the type of environment that vehicle is traveling in.

In some cases, selecting the one or more surfels of the surfel representation having the particular classification includes selecting all surfels in the surfel representation that are associated with vegetation. For example, the environment prediction system 130 (or the server system 122) may select all surfels in the global surfel map 145 that are associated with the third surfel classification (e.g., grass/bush/tree) based on the tendency of vegetation to be unreliable. Surfels that represent vegetation may be considered unreliable due to frequent changes in the position, size, and/or shape of the vegetation, and/or due to vegetation having too fine of detail (e.g., leaves) to consistently perceive from sensor data collected using one or more of the sensors of the sensor subsystems 120.

In some cases, selecting the one more surfels of the surfel representation having the particular classification includes selecting all surfels in the surfel representation that are associated with types of objects other than one or more of the following types of objects: buildings; roadways; road signs; or road barriers. For example, the environment prediction system 130 may select all surfels in the global surfel map that are not associated with the first surfel classification (e.g., sign/metal) and the second surfel classification (e.g., roadway).

The system can optionally update the representation based on the one or more surfels (606). For example, the environment prediction system 130 (or the server system 122) may filter out the selected surfels. That is, the environment prediction system 130 may remove or hide any surfels in the global surfel map 145 that were associated with the third surfel classification (e.g., grass/bush/tree) and the fourth surfel classification (e.g., flag/cloth/clothing). In updating the representation based on the one or more surfels, the system may generate a filtered surfel map. For example, the environment prediction system 130 may generate the filtered surfel map 132 from the global surfel map 145 by removing or hiding any surfels in the global surfel map 145 that were associated with the third surfel classification and the fourth surfel classification.

In some cases, selecting the one or more surfels of the representation having the particular classification includes the system selecting one or more surfels in the representation that have been associated with a particular object of the real-world environment; and updating the representation based on the one or more surfels includes the system filtering the three-dimensional representation to remove or hide all surfels in the three-dimensional representation that have been associated with a particular object of the real-world environment. For example, the environment prediction system 130 may select surfels that have been labelled as being a bush, a tree, a traffic cone, etc. In generating the filtered surfel map 132, the environment prediction system 130 may remove or hide the selected surfels associated with bush objects, tree objects, and/or traffic cone objects.

In some cases, selecting the one or more surfels of the representation having the particular classification includes the system selecting the one or more surfels in the representation that have the particular classification based on a type of environment of the real-world environment; and updating the representation based on the one or more surfels includes the system filtering the three-dimensional representation to remove or hide the one or more surfels. For example, based on the environment 400 being a four-lane road, the environment prediction system 130 may determine that surfels associated with the third surfel classification (e.g., grass/bush/tree) should be removed or hidden based on a lookup table that correlates four-lane roads with the removal/hiding of surfels associated with the third surfel classification.

In some cases, selecting the one or more surfels of the representation having the particular classification includes the system selecting one or more surfels in the representation that have been identified as untrustworthy; and updating the representation based on the one or more surfels includes the system filtering the three-dimensional representation to remove or hide the one or more surfels in the representation that have been identified as untrustworthy. For example, the environment prediction system 130 may identify surfels in the global surfel map that do not have a threshold level of confidence (e.g., in the object they represent, type of object that they represent, level of permanence, etc.). The environment prediction system 130 may proceed to remove or hide these identified surfels in generating the filtered surfel map 132.

In some cases, the system does not update the representation. For example, instead of filtering surfels, the filter module 530 identifies reliable and/or unreliable surfels. That is, the filter module 530 may, using the techniques described above, identify a subset of surfels in the global surfel map 145 that are sufficiently reliable to use for calibration. For example, the filter module 530 may identify all surfels associated with the first surfel classification (e.g., sign/metal) as being sufficiently reliable to use to calibrate one or more on-board sensors of the vehicle 102's on-board system 110. The filter module 530 may optionally tag the surfels in the subset of surfels to indicate that they are sufficiently reliable to use for calibration. A calibration module 532, described below with respect to FIGS. 5C-5D, may identify the subset of surfels using the tags and proceed to use only those surfels for sensor calibration.

In some cases, updating the representation includes tagging one or more surfels to indicate that the one or more surfels are sufficiently reliable for calibration. For example, the environment prediction system 130 may attach a tag to each surfel in a subset of surfels of the global surfel map 145 that the environment prediction system 130 identified as being sufficiently reliable for calibration. Similarly, in some cases, updating the representation includes tagging one or more surfels to indicate that the one or more surfels are not sufficiently reliable for calibration. For example, the environment prediction system 130 may attach a tag to each surfel in a subset of surfels of the global surfel map 145 that the environment prediction system 130 identified as being not sufficiently reliable for calibration.

The system receives input sensor data from one or more sensors installed on the autonomous or semi-autonomous vehicle (608). The input sensor data can include electromagnetic radiation. As an example, the input sensor data can include data collected by one or more of lidar systems that detect reflections of laser light, radar systems that detect reflections of radio waves, or camera systems that detect reflections of visible light. With respect to FIG. 1, the input sensor data can be the raw sensor measurements or the raw sensor data 125 compiled by the sensor subsystems 120. With respect to FIG. 1 and FIG. 4, the autonomous vehicle can be the vehicle 102. The on-board system 110 can include the sensors that collect the input sensor data. For example, the on-board system 110 can include one or more of a lidar system that detect reflections of laser light, a radar system that detect reflections of radio waves, or a camera system that detect reflections of visible light. The sensor data generated by a given sensor, e.g., of the on-board system 110, generally indicates a distance, a direction, and an intensity of reflected radiation. For example, a sensor of the on-board system 110 can transmit one or more pulses of electromagnetic radiation in a particular direction and can measure the intensity of any reflections as well as the time that the reflection was received. A distance can be computed by determining how long it took between a pulse and its corresponding reflection. The sensor can continually sweep a particular space in angle, azimuth, or both. Sweeping in azimuth, for example, can allow a sensor to detect multiple objects along the same line of sight.

The system compares the input sensor data to the updated to identify differences between the observation and the updated representation (610). The updated representation may also be a three-dimensional representation, e.g., of a particular environment that the vehicle is traveling in or is about to enter. In general, this can include identifying multiple points in the input sensor data, and performing point matching to find corresponding points in the updated three-dimensional representation. The locations of the matching points may be compared to an expected location of the matching points to make calibration adjustments.

For example, as described in detail above with respect to FIG. 5C, the environment prediction system 130 may compare raw lidar sensor data 524 to the filtered surfel map 132 by performing lidar dense calibration. Similarly, as described in detail above with respect to FIG. 5D, the environment prediction system 130 may compare raw image data 526 to the filtered surfel map 132 by performing camera feature matching.

In some cases, comparing the input sensor data to the updated representation to identify differences between the observation and the representation includes the system: estimating three-dimensional point data from the laser data, where the observation is the three-dimensional point data; and performing dense image matching using the three-dimensional point data to identify point matches between the observation and the three-dimensional representation. For example, the calibration module 532 may generate a point cloud from the raw lidar sensor data 524. The calibration module 532 may proceed to compare the point cloud (or a portion of the point cloud) to the filtered surfel map 132 to identify point matches between the point cloud (or the portion of the point cloud) and the filtered surfel map 132. The differences between the observation and the three-dimensional representation can include distances between the matching points in the point data and corresponding surfels in the representation, and calibrating the at least one sensor can include the system calibrating the lidar system using the distances. For example, the calibration module 532 may calculate distances between the matching points in the point data and the corresponding surfels in the representation (e.g., the expected locations of the point matches). The calibration module 532 may proceed to generate the updated lidar sensor parameters 534*b* using these distances.

In some cases, comparing the input sensor data to the three-dimensional representation to identify differences between the observation and the three-dimensional representation includes the system performing feature matching using the image data and the three-dimensional representation to identify features in the image data that match corresponding features in the three-dimensional representation. For example, the calibration module 532 of the environment prediction system 130 may perform feature matching using the raw image data 526 (or vectors derived from the raw image data 526) and the filtered surfel map 132. In performing the feature matching, the calibration module 532 can match features in the images to corresponding features in the filtered surfel map 132. Featuring matching may include, for example, identifying keypoints in the raw image data 526 and matching those keypoints to corresponding points in the filtered surfel map 132.

The features in the three-dimensional representation may correspond to groupings of surfels in the three-dimensional representation. For example, the flagged features shown in FIG. 5C are those groupings of surfels that have been associated with the first surfel classification (e.g., sign/metal). This may include a first grouping of surfels corresponding to the flag pole 426 and a second grouping of surfels corresponding to the sign 430.

The differences between the observation and the three-dimensional representation may include distances between the features in the image data and corresponding groupings of surfels in the three-dimensional representation, and calibrating the at least one sensor includes the system calibrating the one or more cameras using the distances. For example, the calibration module 532 may calculate distances between an expected location for the location of the sign 430 and matched location of the sign 430 with respect to the filtered surfel map 432. The calibration module 532 may use these distances to generate the updated camera parameters 538*b*.

The system calibrates at least one sensor of the one or more sensors using the differences (612). In general, the system may use the distances between locations of point matches to expected locations of point matches to determine updates to make to the parameters of one or more sensors, such as a camera and/or a lidar sensor. As an example, with respect to FIG. 5C, the calibration module 532 of the environment prediction system 130 may update a laser range offset, various position offsets, and/or various rotation offsets for the lidar sensor based on difference between actual locations of matched points from a point cloud generated using the raw lidar sensor data 524 and expected locations.

In some cases, calibrating the one or more cameras comprises adjusting one or more of the following: an offset of a camera of the one or more cameras; a rotation a camera of the one or more cameras; a radial distortion parameters of a lens of a camera of the one or more cameras; or a focal length of a lens of a camera of the one or more cameras.

In some cases, the system determines a type of environment of the real-world environment using the representation. For example, the environment prediction system 130 may use the global surfel map 145 to identify a type of environment that the environment 400. Specifically, the environment prediction system 130 may look at the classifications/labels of the surfels that are used to represent the environment (e.g., if more than 50% of the surfels correspond to the fifth surfel classification for concrete, the environment prediction system 130 may conclude that the type of environment is a city). The environment prediction system 130 may also use the global surfel map 145 to identify a type of environment based on the types of objects in the environment 400 and/or based on the size of objects in the environment 400 (e.g., width of the road 404). Calibrating the at least one sensor can include the system determining that calibration is viable based on the type of environment. For example, the calibration module 532 of the environment prediction system 130 may determine that not calibration should be attempted due the environment being classified as a heavily forested area (e.g., a type of environment that includes objects that are frequently changing in appearance, that are frequently changing position, that include too fine of detail to accurately use for calibration, etc.). The calibration module 532 may similarly determine that calibration is not viable based on, for example, current weather conditions in the environment 400.

In some cases, determining the type of environment of the real-world environment using the representation includes the system: analyzing the representation or a portion of the representation to identify classifications of surfels in the representation or the portion of the representation; and based on percentages of the classifications of the surfels in the representation or the portion of the representation, determining a type of environment from multiple types of environments. For example, the environment prediction system 130 may determine that the environment 400 is a heavily forested if at least 82% of the surfels that represent the environment 400 in the global surfel map 145 are classified as vegetation.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, off-the-shelf or custom-made parallel processing subsystems, e.g., a GPU or another kind of special-purpose processing subsystem. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g, a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments described above, the following embodiments are also innovative:

Embodiment 1 is a method comprising:
  obtaining a three-dimensional surfel representation of a real-world environment, the surfel representation comprising a plurality of surfels,
    wherein each of the surfels corresponds to a respective location of plurality of locations in a three-dimensional space of the real-world environment, and
    wherein multiple surfels of the plurality of surfels are associated with a plurality of different classifications;
  selecting one or more surfels of the surfel representation having a particular classification of the different classifications;
  receiving input sensor data from one or more sensors installed on an autonomous or semi-autonomous vehicle, the input sensor data indicating an observation of at least a portion of the real-world environment;
  comparing the input sensor data to the surfel representation to identify one or more differences between the observation and the surfel representation; and
  calibrating at least one sensor of the one or more sensors using the one or more differences between the observation and the surfel representation.

Embodiment 2 is the method of embodiment 1, comprising updating the surfel representation based on the one or more surfels,
  wherein comparing the input sensor data to the surfel representation to identify the one or more differences between the observation and the surfel representation comprises comparing the input sensor data to the updated surfel representation to identify one or more differences between the observation and the updated surfel representation.

Embodiment 3 is the method of embodiments 2, wherein updating the surfel representation based on the one or more surfels comprises filtering the surfel representation to remove or hide the one or more surfels having the particular classification.

Embodiment 4 is the method of any one of embodiments 2-3, wherein:
  selecting the one or more surfels of the surfel representation having the particular classification comprises selecting all surfels in the surfel representation that have the particular classification; and
  updating the surfel representation based on the one or more surfels comprises filtering the surfel representation to remove or hide all surfels in the representation that have the particular classification.

Embodiment 5 is the method of any one of embodiments 2-4, wherein:

selecting the one or more surfels of the surfel representation having the particular classification comprises selecting one or more surfels in the surfel representation that have been associated with a particular object of the real-world environment; and updating the surfel representation based on the one or more surfels comprises filtering the surfel representation to remove or hide all surfels in the surfel representation that have been associated with a particular object of the real-world environment.

Embodiment 6 is the method of any one of embodiments 2-5, wherein:

selecting the one or more surfels of the surfel representation having the particular classification comprises selecting the one or more surfels in the surfel representation that have the particular classification based on a type of environment of the real-world environment; and updating the surfel representation based on the one or more surfels comprises filtering the surfel representation to remove or hide the one or more surfels.

Embodiment 7 is the method of any one of embodiments 2-6, wherein:

selecting the one or more surfels of the surfel representation having the particular classification comprises selecting one or more surfels in the surfel representation that have been identified as untrustworthy; and updating the surfel representation based on the one or more surfels comprises filtering the surfel representation to remove or hide the one or more surfels in the surfel representation that have been identified as untrustworthy.

Embodiment 8 is the method of any one of embodiments 2-7, wherein updating the surfel representation based on the one or more surfels comprises attaching a tag to surfels in the surfel representation other than the one or more surfels, wherein the tag indicates that the corresponding surfels are sufficiently reliable.

Embodiment 9 is the method of any one of embodiments 2-8, wherein updating the surfel representation based on the one or more surfels comprises attaching a tag to the one or more surfels, wherein the tag indicates that the corresponding surfels are not sufficiently reliable.

Embodiment 10 is the method of any one of embodiments 1-9, wherein selecting the one or more surfels of the surfel representation having the particular classification comprises selecting all surfels in the surfel representation that are associated with vegetation.

Embodiment 11 is the method of any one of embodiments 1-10, wherein selecting the one more surfels of the surfel representation having the particular classification comprises selecting all surfels in the surfel representation that are associated with types of objects other than one or more of the following types of objects:
- buildings;
- roadways;
- road signs; or
- road barriers.

Embodiment 12 is the method of any one of embodiments 1-11, wherein:

receiving input sensor data from the sensors installed on the autonomous or semi-autonomous vehicle comprises receiving laser data from a lidar system, and the one or more sensors installed on the autonomous or semi-autonomous vehicle include the lidar system.

Embodiment 13 is the method of any one of embodiments 1-12, wherein:

comparing the input sensor data to the surfel representation to identify the one or more differences between the observation and the surfel representation comprises:
  estimating three-dimensional point data from the laser data, wherein the observation is the three-dimensional point data; and
  performing dense image matching using the three-dimensional point data to
  identify point matches between the observation and the surfel representation, the one or more differences between the observation and the surfel representation include one or more distances between the matching points in the point data and corresponding surfels in the surfel representation, and calibrating the at least one sensor comprises calibrating the lidar system using the one or more distances.

Embodiment 14 is the method of any one of embodiments 1-13, wherein:

receiving input sensor data from the one or more sensors installed on the autonomous or semi-autonomous vehicle comprises receiving image data from one or more cameras, and the one or more sensors installed on the autonomous or semi-autonomous vehicle include the one or more cameras.

Embodiment 15 is the method of any one of embodiments 1-14, wherein:

comparing the input sensor data to the surfel representation to identify the one or more differences between the observation and the surfel representation comprises performing feature matching using the image data and the surfel representation to identify one or more features in the image data that match corresponding one or more features in the surfel representation, the one or more features in the surfel representation correspond to one or more groupings of surfels in the surfel representation, the one or more differences between the observation and the three-dimensional representation include one or more distances between the one or more features in the image data and corresponding one or more groupings of surfels in the surfel representation, and calibrating the at least one sensor comprises calibrating the one or more cameras using the one or more distances.

Embodiment 16 is the method of any one of embodiments 1-15, wherein calibrating the one or more cameras comprises adjusting one or more of the following:
- an offset of a camera of the one or more cameras;
- a rotation a camera of the one or more cameras;
- radial distortion parameters of a lens of a camera of the one or more cameras; or
- a focal length of a lens of a camera of the one or more cameras.

Embodiment 17 is the method of any one of embodiments 1-16, comprising determining a type of environment of the real-world environment using the surfel representation, wherein calibrating the at least one sensor comprises determining that calibration is viable based on the type of environment.

Embodiment 18 is the method of any one of embodiments 1-17, wherein determining the type of environment of the real-world environment using the surfel representation comprises:

analyzing the surfel representation or a portion of the surfel representation to identify classifications of surfels in the surfel representation or the portion of the surfel representation; and based on percentages of the classifications of the surfels in the surfel representation or the portion of the surfel representation, determining a type of environment from multiple types of environments.

Embodiment 19 is a system comprising: one or more computers and one or more storage devices storing instructions that are operable, when executed by the one or more computers, to cause the one or more computers to perform the method of any one of embodiments 1 to 18.

Embodiment 20 is a computer storage medium encoded with a computer program, the program comprising instructions that are operable, when executed by data processing apparatus, to cause the data processing apparatus to perform the method of any one of embodiments 1 to 18.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

What is claimed is:

1. A computer implemented method comprising:
    obtaining a three-dimensional surfel representation of a real-world environment generated from initial sensor data captured by a plurality of vehicles traveling in the real-world environment, the surfel representation comprising a plurality of surfels,
        wherein each of the surfels corresponds to a respective location of plurality of locations in a three-dimensional space of the real-world environment, and
        wherein multiple surfels of the plurality of surfels are associated with a plurality of different classifications;
    selecting one or more surfels of the surfel representation having a particular classification of the different classifications;
    receiving input sensor data from one or more sensors installed on a first vehicle, the input sensor data indicating an observation of at least a portion of the real-world environment;
    comparing the input sensor data captured by the first vehicle to the surfel representation generated from the initial sensor data captured by the plurality of vehicles to identify one or more differences between the observation and the surfel representation,
        wherein comparing the input sensor data to the surfel representation comprises performing feature matching using the sensor data and the surfel representation to identify one or more features in the sensor data that match corresponding one or more features in the surfel representation; and
    calibrating at least one sensor of the one or more sensors using the one or more differences between the observation and the surfel representation.

2. The method of claim 1, comprising updating the surfel representation based on the one or more surfels,
    wherein comparing the input sensor data to the surfel representation to identify the one or more differences between the observation and the surfel representation comprises comparing the input sensor data to the updated surfel representation to identify one or more differences between the observation and the updated surfel representation.

3. The method of claim 2, wherein updating the surfel representation based on the one or more surfels comprises filtering the surfel representation to remove or hide the one or more surfels having the particular classification.

4. The method of claim 2, wherein:
    selecting the one or more surfels of the surfel representation having the particular classification comprises selecting all surfels in the surfel representation that have the particular classification; and
    updating the surfel representation based on the one or more surfels comprises filtering the surfel representation to remove or hide all surfels in the representation that have the particular classification.

5. The method of claim 2, wherein:
    selecting the one or more surfels of the surfel representation having the particular classification comprises selecting one or more surfels in the surfel representation that have been associated with a particular object of the real-world environment; and
    updating the surfel representation based on the one or more surfels comprises filtering the surfel representation to remove or hide all surfels in the surfel representation that have been associated with a particular object of the real-world environment.

6. The method of claim 2, wherein:
    selecting the one or more surfels of the surfel representation having the particular classification comprises selecting the one or more surfels in the surfel representation that have the particular classification based on a type of environment of the real-world environment; and
    updating the surfel representation based on the one or more surfels comprises filtering the surfel representation to remove or hide the one or more surfels.

7. The method of claim 2, wherein:
    selecting the one or more surfels of the surfel representation having the particular classification comprises selecting one or more surfels in the surfel representation that have been identified as untrustworthy; and
updating the surfel representation based on the one or more surfels comprises filtering the surfel representation to remove or hide the one or more surfels in the surfel representation that have been identified as untrustworthy.

8. The method of claim 2, wherein updating the surfel representation based on the one or more surfels comprises attaching a tag to surfels in the surfel representation other than the one or more surfels, wherein the tag indicates that the corresponding surfels are sufficiently reliable.

9. The method of claim 2, wherein updating the surfel representation based on the one or more surfels comprises attaching a tag to the one or more surfels, wherein the tag indicates that the corresponding surfels are not sufficiently reliable.

10. The method of claim 1, wherein selecting the one or more surfels of the surfel representation having the particular classification comprises selecting all surfels in the surfel representation that are associated with vegetation.

11. The method of claim 1, wherein selecting the one more surfels of the surfel representation having the particular classification comprises selecting all surfels in the surfel representation that are associated with types of objects other than one or more of the following types of objects:
buildings;
roadways;
road signs; or
road barriers.

12. The method of claim 1, wherein:
receiving input sensor data from the sensors installed on the autonomous or semi-autonomous vehicle comprises receiving laser data from a lidar system, and
the one or more sensors installed on the autonomous or semi-autonomous vehicle include the lidar system.

13. The method of claim 12, wherein:
comparing the input sensor data to the surfel representation to identify the one or more differences between the observation and the surfel representation comprises:
estimating three-dimensional point data from the laser data, wherein the observation is the three-dimensional point data; and
performing dense image matching using the three-dimensional point data to identify point matches between the observation and the surfel representation,
the one or more differences between the observation and the surfel representation include one or more distances between the matching points in the point data and corresponding surfels in the surfel representation, and
calibrating the at least one sensor comprises calibrating the lidar system using the one or more distances.

14. The method of claim 1, wherein:
receiving input sensor data from the one or more sensors installed on the autonomous or semi-autonomous vehicle comprises receiving image data from one or more cameras, and
the one or more sensors installed on the autonomous or semi-autonomous vehicle include the one or more cameras.

15. The method of claim 14, wherein:
comparing the input sensor data to the surfel representation to identify the one or more differences between the observation and the surfel representation comprises performing feature matching using the image data and the surfel representation to identify one or more features in the image data that match corresponding one or more features in the surfel representation,
the one or more features in the surfel representation correspond to one or more groupings of surfels in the surfel representation,
the one or more differences between the observation and the three-dimensional representation include one or more distances between the one or more features in the image data and corresponding one or more groupings of surfels in the surfel representation, and
calibrating the at least one sensor comprises calibrating the one or more cameras using the one or more distances.

16. The method of claim 15, wherein calibrating the one or more cameras comprises adjusting one or more of the following:
an offset of a camera of the one or more cameras;
a rotation a camera of the one or more cameras;
radial distortion parameters of a lens of a camera of the one or more cameras; or
a focal length of a lens of a camera of the one or more cameras.

17. The method of claim 1, comprising determining a type of environment of the real-world environment using the surfel representation,
wherein calibrating the at least one sensor comprises determining that calibration is viable based on the type of environment.

18. The method of claim 17, wherein determining the type of environment of the real-world environment using the surfel representation comprises:
analyzing the surfel representation or a portion of the surfel representation to identify classifications of surfels in the surfel representation or the portion of the surfel representation; and
based on percentages of the classifications of the surfels in the surfel representation or the portion of the surfel representation, determining a type of environment from multiple types of environments.

19. A system comprising:
one or more computers; and
one or more storage devices storing instructions that are operable, when executed by the one or more computers, to cause the one or more computers to perform the operations comprising:
obtaining a three-dimensional surfel representation of a real-world environment generated from initial sensor data captured by a plurality of vehicles traveling in the real-world environment, the surfel representation comprising a plurality of surfels,
wherein each of the surfels corresponds to a respective location of plurality of locations in a three-dimensional space of the real-world environment, and
wherein multiple surfels of the plurality of surfels are associated with a plurality of different classifications;
selecting one or more surfels of the surfel representation having a particular classification of the different classifications;
receiving input sensor data from one or more sensors installed on a first vehicle, the input sensor data indicating an observation of at least a portion of the real-world environment;
comparing the input sensor data captured by the first vehicle to the surfel representation generated from the initial sensor data captured by the plurality of vehicles to identify one or more differences between the observation and the surfel representation, wherein comparing the input sensor data to the surfel representation comprises performing feature matching using the sensor data and the surfel representation to identify one or more features in the sensor data that match corresponding one or more features in the surfel representation; and calibrating at least one sensor of the one or more sensors using the one or more differences between the observation and the surfel representation.

20. A non-transitory computer storage medium encoded with a computer program, the program comprising instructions that are operable, when executed by data processing apparatus, to cause the data processing apparatus to perform the operations comprising:

obtaining a three-dimensional surfel representation of a real-world environment generated from initial sensor data captured by a plurality of vehicles traveling in the real-world environment, the surfel representation comprising a plurality of surfels, wherein each of the surfels corresponds to a respective location of plurality of locations in a three-dimensional space of the real-world environment, and wherein multiple surfels of the plurality of surfels are associated with a plurality of different classifications;

selecting one or more surfels of the surfel representation having a particular classification of the different classifications;

receiving input sensor data from one or more sensors installed on a first vehicle, the input sensor data indicating an observation of at least a portion of the real-world environment;

comparing the input sensor data captured by the first vehicle to the surfel representation generated from the initial sensor data captured by the plurality of vehicles to identify one or more differences between the observation and the surfel representation, wherein comparing the input sensor data to the surfel representation comprises performing feature matching using the sensor data and the surfel representation to identify one or more features in the sensor data that match corresponding one or more features in the surfel representation; and calibrating at least one sensor of the one or more sensors using the one or more differences between the observation and the surfel representation.

* * * * *